(12) United States Patent  
Johnston et al.

(10) Patent No.: US 12,209,932 B1  
(45) Date of Patent: Jan. 28, 2025

(54) APPARATUS AND METHOD FOR INLINE LEAK DETECTION AND QUANTIFICATION

(71) Applicant: INLINE SERVICES, LLC, Tomball, TX (US)

(72) Inventors: Jeffrey Johnston, Houston, TX (US); Justin Scruggs, Houston, TX (US)

(73) Assignee: INLINE SERVICES, LLC, Tomball, TX (US)

( * ) Notice: Subject to any disclaimer, the term of this patent is extended or adjusted under 35 U.S.C. 154(b) by 0 days.

(21) Appl. No.: 18/770,892

(22) Filed: Jul. 12, 2024

Related U.S. Application Data

(60) Provisional application No. 63/528,594, filed on Jul. 24, 2023.

(51) Int. Cl.
*G01M 3/28* (2006.01)
*F16L 55/40* (2006.01)
*F16L 101/30* (2006.01)

(52) U.S. Cl.
CPC ........... *G01M 3/2815* (2013.01); *F16L 55/40* (2013.01); *G01M 3/2823* (2013.01); *F16L 2101/30* (2013.01)

(58) Field of Classification Search
CPC ... G01M 3/2815; G01M 3/2823; F16L 55/40; F16L 2101/30
See application file for complete search history.

(56) References Cited

U.S. PATENT DOCUMENTS

| | | | |
|---|---|---|---|
| 2,936,619 A | * | 5/1960 | Gibney ............... G01F 1/666 73/181 |
| 3,667,285 A | | 6/1972 | Wright |
| 3,690,150 A | | 9/1972 | Mullen |
| 3,838,593 A | | 10/1974 | Thompson |
| 3,974,680 A | * | 8/1976 | Beaver ............. G01M 3/2823 73/40.5 R |
| 4,306,446 A | | 12/1981 | Fukuda |
| 4,308,746 A | | 1/1982 | Covington |
| 4,650,559 A | | 3/1987 | Horigome |

(Continued)

FOREIGN PATENT DOCUMENTS

| | | | |
|---|---|---|---|
| CN | 115126963 A | * 9/2022 | ............. F16L 55/32 |
| EM | 0186478 A2 | 2/1986 | |

(Continued)

*Primary Examiner* — Peter J Macchiarolo
*Assistant Examiner* — Anthony W Megna Fuentes
(74) *Attorney, Agent, or Firm* — CLEARPAT SERVICES, LLC; Brian Burkinshaw

(57) ABSTRACT

An improved pipeline leak detecting pig apparatus configured to locate leaks in the wall of a pipeline as the apparatus is pushed by pressurized fluid through the pipeline. The apparatus is configured with or without absolute pressure sensors and a flow meter configured to detect fluid flow through a controlled volume on the pig passing a leak in the pipeline and pressurized fluid in the controlled volume escapes through the leak. Pressure sensors, when provided, provide a secondary confirmation of the presence of a leak and the degree of severity when an absolute pressure drop in the controlled volume occurs. Onboard microcontrollers record continuous odometer pulses, apparatus diagnostic information and pressure and flow measurements for later analysis, quantification and determination of leak location.

28 Claims, 15 Drawing Sheets

(56) References Cited

U.S. PATENT DOCUMENTS

| | | | |
|---|---|---|---|
| 4,796,446 A | 1/1989 | Farmer | |
| 10,481,036 B2 | 11/2019 | Zhu | |
| 2002/0190682 A1* | 12/2002 | Schempf | G01N 29/265 318/568.11 |
| 2011/0301893 A1* | 12/2011 | Leal Diaz | F16L 55/1283 702/65 |
| 2018/0209574 A1* | 7/2018 | Long | B08B 9/0557 |

FOREIGN PATENT DOCUMENTS

| | | | | |
|---|---|---|---|---|
| GB | 2327759 A | * | 2/1999 | G01M 3/2823 |
| GB | 2327759 B | | 3/1999 | |
| GB | 2506838 A | | 4/2014 | |
| WO | WO-2021044171 A1 | * | 3/2021 | F16L 55/30 |

* cited by examiner

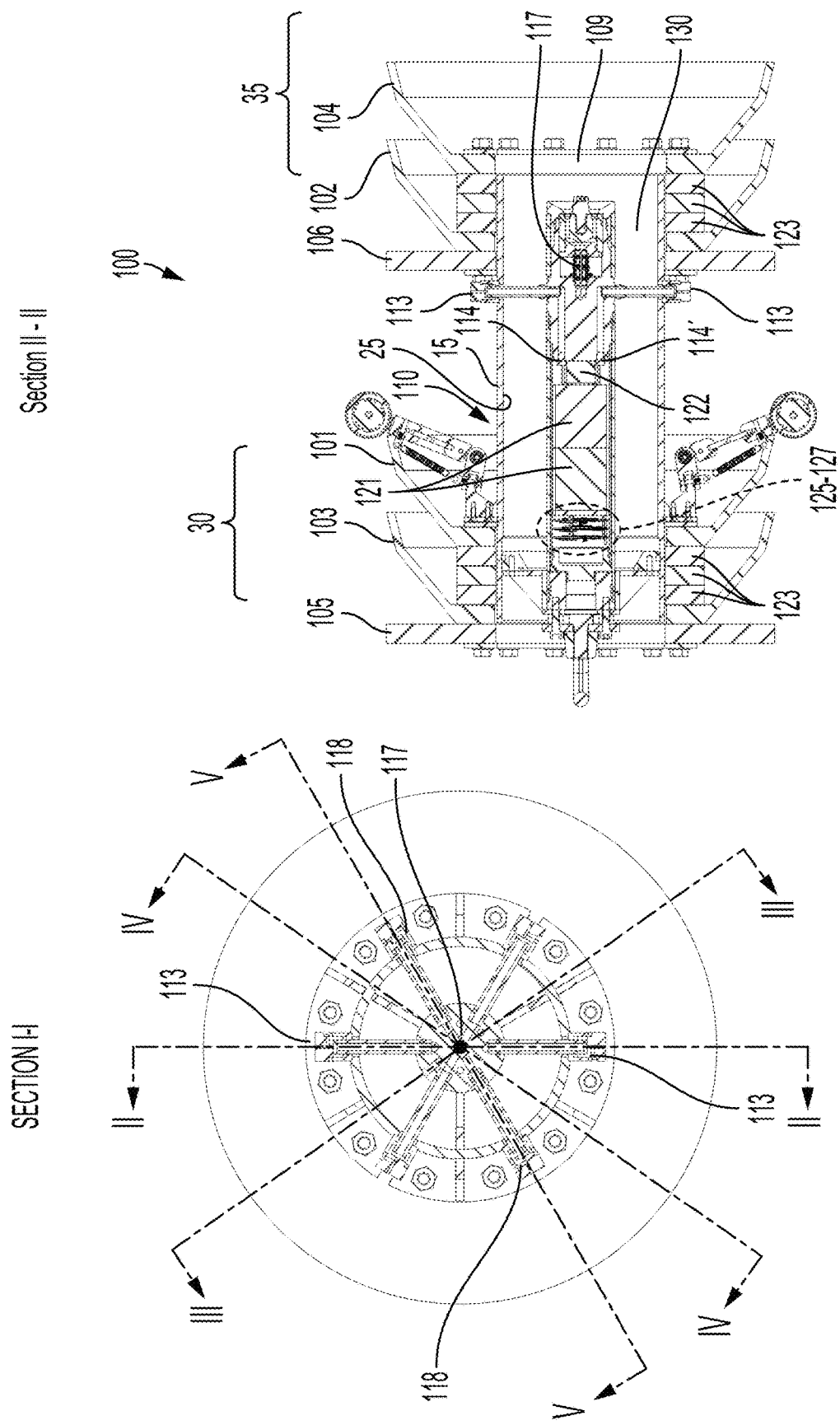

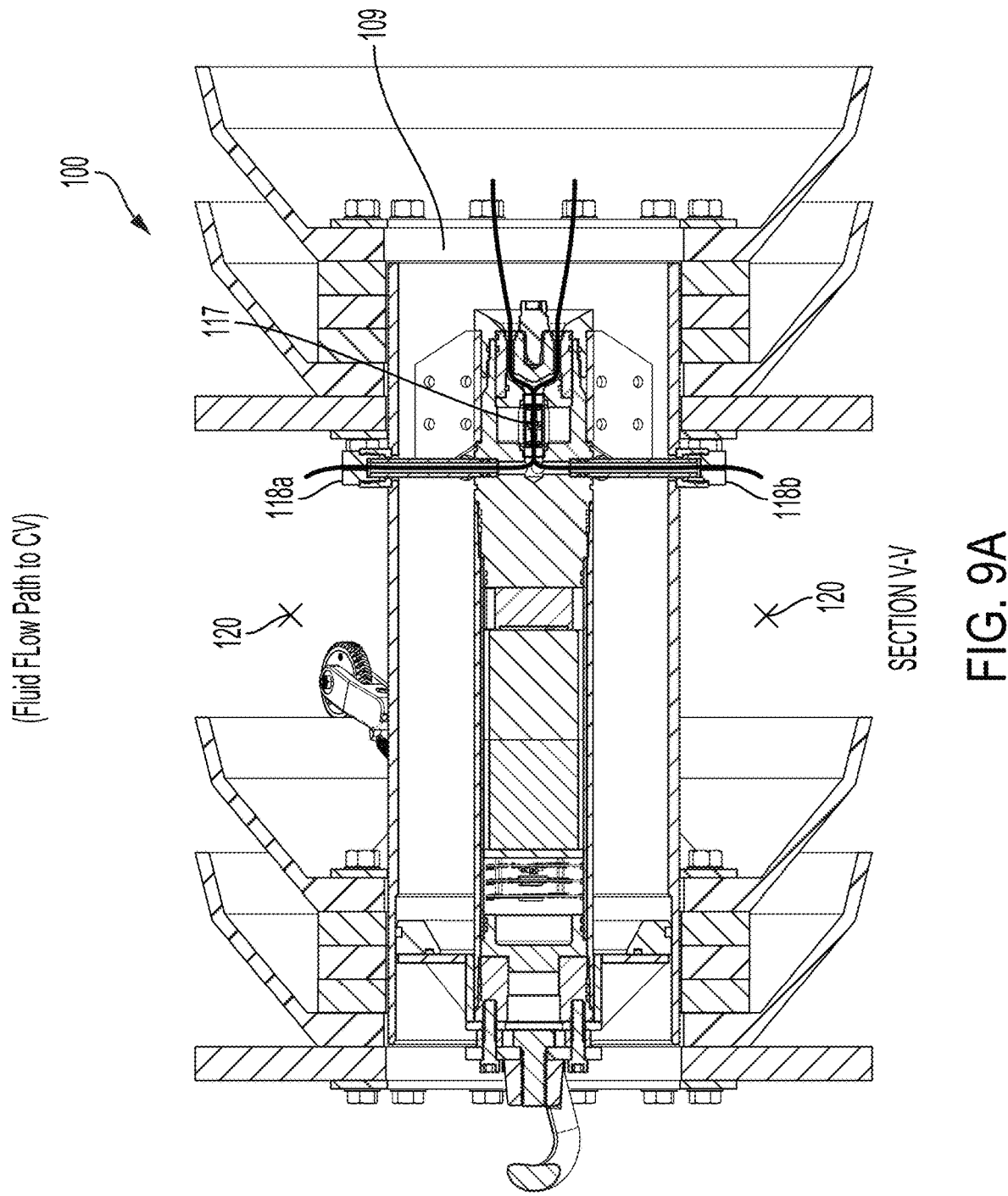

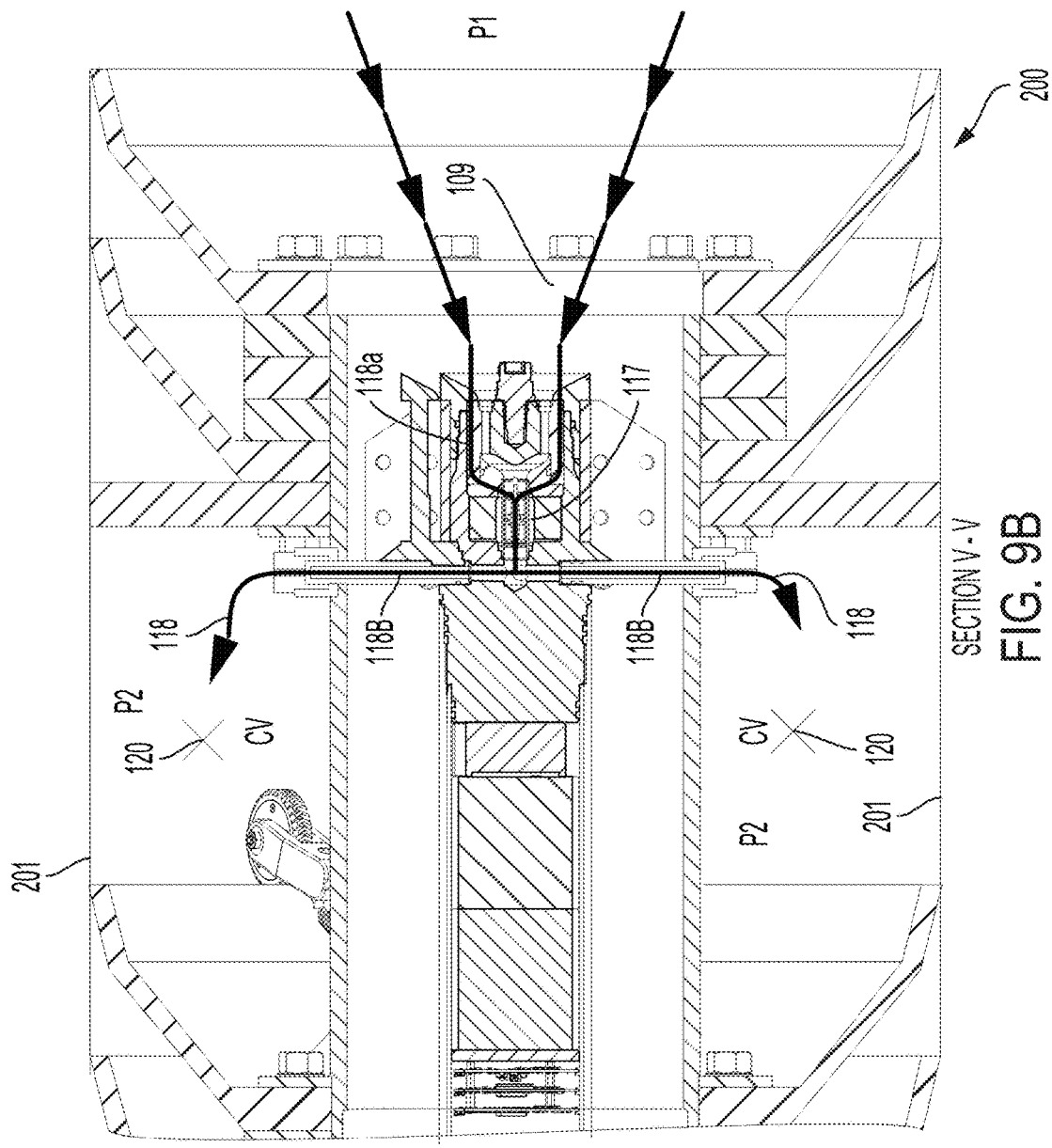

APPARATUS AND METHOD FOR INLINE LEAK DETECTION AND QUANTIFICATION

CROSS-REFERENCE

This application claims the benefit of U.S. Provisional Application No. 63/528,594, filed Jul. 24, 2023, which application is incorporated herein by reference.

BACKGROUND

The present disclosure is directed to pipeline tools and specifically to leak detection tools (LDT) for use in pipelines. More particularly, the tools described herein refer to tools used in the oil, water and gas industries. Pipelines are used to carry fluids such as hydrocarbons long distances between production and processing facilities. Over the course of the transit, any leaks in the pipeline may result in loss of product or environmental contamination. Due to the length of the pipeline, which may stretch hundreds of miles, traverse difficult or impassable terrain or may be located underground or subsea, the precise location of a leak may be difficult to identify.

In pipeline transportation, the use of "pigs" or pigging is the practice of using "pipeline inspection gauges or gadgets", devices generally referred to as "pigs" or "scrapers", to perform various maintenance operations. This is done without stopping the flow of product in the pipeline. These operations include but are not limited to cleaning and inspecting the pipeline. This application is primarily centered around the use of pigs as "leak detection tools" or LDTs, to locate and identify leaks and their location within a pipeline.

SUMMARY

Pigging technology has been around in different forms since the early part of the twentieth century. The term originates from the initial pig devices, which were bundles of straw wrapped with wire or leather that were forced down the pipeline, resulting in a squealing sound. The term "pipeline inspection gauge" is a backronym and helps to accurately represent the increased capabilities of these devices. The spherical or cylindrical devices manufactured today vary in construction material, size, color, and accessory components. Common to all pigs, however, is that they closely conform to the ID of the pipe. This allows the device to knock away any accumulated debris or material and to inspect for cracks or flaws in the pipe.

Over the years a variety of methods and pig devices, often called "smart pigs" have been developed to perform inspections and gather information within active pipelines, which include temperature and pressure, corrosion and metal loss, diameter, bends, and curvature.

Further, it is known that natural gas, for example, is compressed and transported through transmission pipelines (typically 6-48 inches in diameter) to pressures typically ranging from 200 to 1500 pounds of pressure per square inch. Compressor stations on transmission pipelines are generally built every 50 to 100 miles along the length of a transmission pipeline, allowing pressure to be increased as needed to keep the gas moving. Once the lines feed into a "city gate", where a transmission pipeline feeds into a lower pressure distribution system, some gas mains (2 to 24 inches in diameter) in a distribution system may operate up to 200 psi, but the small service lines that deliver gas to individual homes are typically well under 10 psi.

The present disclosure provides for a leak detection tool (LDT) apparatus, often referred to as a "leak detection pig". The improved design presented herein utilizes the gathering and analysis of absolute pressures and fluid flows as measured within the pipeline and the leak detection pig to not only detect the presence of a leak but to also quantify the flow rate of fluid being lost through the leak, down to a very low volume, in addition to being able to identify the location of the leak to a high degree of certainty.

Previous attempts have been described wherein inventors have developed tools that can be inserted into pipelines while fluid is flowing that will detect leaks due to pipe damage or poor joints as it moves through the pipeline, being transported by the fluid flowing therein.

One such device is a pipeline pig described in GB2327759B by Ashworth, published in 1999, which describes a leak detecting system having a free flow pig with resilient cups and a central body portion defining an exterior test chamber when contacting the inside diameter of a pipeline. The Ashworth device measures and uses differential pressures taken at several locations compared to the fluid at the rear of the pig. These differential pressures are recorded and stored on board in the pig and later retrieved for analysis. In addition, an odometer device records the velocity and distance traveled by the pig within the pipeline relative to the locations of the differential pressure readings. Based purely on changes in differential pressure readings between the pipeline and the test chambers, the device was able to determine with a relative degree of certainty where "relatively small leaks" could exist in the pipeline. At the time of this patent, a "relatively small gas leak" was defined as 100 scmh (standard cubic meters/hour), or 1.67 scmm (standard cubic meters/min), or approximately 3,531 cubic feet/hour or 58.85 cubic feet/minute gas leak. By comparison, a modern natural gas well can typically produce about 162,516 ft$^3$ of natural gas per day, which equates to about 21,538 scmh. Put yet another way, if this were a liquid leak; 100 scmh would be equal to approximately 26,417 gallons per hour, or approximately 440 gallons per minute. By today's standards, a leak of this magnitude would be considered an ecological disaster. For additional comparison, the Deepwater Horizon Oil Spill in 2010 resulted in a loss of 134 million gallons of crude oil released into the Gulf of Mexico over 87 days, equivalent to 1,070 gals/min of crude oil spilling into the Gulf over that period. Ecological recovery is still ongoing to this day, more than 14 years later.

The leak detecting pig apparatus described herein is a significant improvement over Ashworth. The present design utilizes a combination of detailed flow rate analysis combined with simultaneously obtained absolute pressures, to very accurately determine the presence of very small leaks and quantify such leaks to volumes as low as 0.5 gallons per minute, or 30 gallons/hour, or 0.1136 scmh, an improvement of approximately 880 times. In addition, by utilizing a flow meter directly in the fluid leak flow path, the device can now directly measure the leak rate, rather than indirectly measuring the leak using differential pressure sensors alone, as Ashworth had done.

Provided herein is a pipeline leak detecting pig apparatus for detecting leaks in the wall of a pipeline as the apparatus is pushed by pressurized fluid through the pipeline, the apparatus comprising an outer housing having a first end, a second end, a first inner diameter and first outer diameter; a front seal stack coupled to the first end of the outer housing, positioned to seal against an inner surface of a pipeline; a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume; a fluid path, fluidly coupled between the control volume and the rear of the apparatus, in communication with a flow meter and the pipeline behind the apparatus; the flow meter, configured to measure a flow rate through the fluid path; a rear pressure sensor positioned to measure a first absolute pressure P1 in the pipeline behind the rear seal stack; a control volume pressure sensor positioned to measure a second absolute pressure P2 in the control volume; and a front pressure sensor positioned to measure a third absolute pressure P3 in the pipeline ahead of the front seal stack; wherein said pressure sensors P1, P2 and P3 measure absolute pressures at a plurality of locations of the pig as it passes through the pipeline; wherein said flow meter measures for any fluid flow through the apparatus from the rear of the apparatus into the control volume; and wherein a leak in the pipeline can be detected when P1>P2 and the flow meter measures flow rate F>0 through the control volume.

In some embodiments, a leak can be characterized by the flow meter alone, in that any fluid lost through a leak in the pipeline as the Leak Detecting Pig Apparatus control volume passes over it, can only be replaced by the fluid moving through the flow path of the Leak Detecting Pig Apparatus, and the flow meter is in the flow path. The flow meter is capable of detecting a flow rate as low as 0.5 gpm.

In some embodiments, the pipeline leak detecting pig apparatus further comprises a first pressure port behind the rear seal stack in fluid communication with a first pressure flow path PFP1 between the rear seal stack and the first pressure sensor P1; a second pressure port in fluid communication with a second pressure flow path PFP2 between the control volume CV and the second pressure sensor P2; and a third pressure port in fluid communication with a third pressure flow path PFP3 located between a sealed pressure bulkhead and the third pressure sensor P3 and between a first inner instrument housing within the outer housing and a second inner instrument housing, wherein absolute pressure values from each location can be read directly by the pressure sensors P1, P2 and P3.

In some embodiments of the pipeline leak detecting pig apparatus, the absolute pressure sensor values are conveyed to a first onboard microcontroller, PCB-1 for recording and later analysis.

In some embodiments of the pipeline leak detecting pig apparatus, any fluid flow through the pig from the back of the pig into the control volume, which would indicate the presence of a leak, is also conveyed to the first onboard microcontroller, PCB-1 for recording and later analysis.

In some embodiments of the pipeline leak detecting pig apparatus, each pressure sensor, P1, P2, P3 may have at least one redundant pressure sensor to provide a redundant absolute pressure value for each measurement in the event of failure of the primary pressure sensor, and wherein, said redundant pressure sensor values are conveyed to the first onboard PCB-1 for recording and later analysis.

In some embodiments of the pipeline leak detecting pig apparatus, said front seal stack and rear seal stack may each comprise at least two flexible annular seals, wherein the outermost annular seals are a redundant seal pair, and the innermost annular seals form a primary or first pair, which form front and rear ends of the annular control volume with the outer diameter of the outer housing, and the inner surface of the pipeline.

In some embodiments of the pipeline leak detecting pig apparatus, the front seal stack and real seal stack further comprising seal spacers between each of the outermost annular seals and the innermost annular seals.

In some embodiments, the pipeline leak detecting pig apparatus further comprises: a first inner instrument housing within the outer housing having a first inner housing end, a second inner housing end, a first inner instrument housing inner diameter and a first inner instrument housing outer diameter; wherein the first inner instrument housing outer diameter, the first inner diameter of the outer housing and a bulkhead create a pressure vessel within the leak detecting pig apparatus in communication with the pressurized fluid within the pipeline at rear of the leak detecting apparatus and wherein the flow meter resides in the inner instrument housing and the fluid path to the control volume passes through the inner instrument housing and the pressure vessel and is in fluid communication with the control volume via a flow tube.

In some embodiments of the pipeline leak detecting pig apparatus, the apparatus may have two or more flow meters in a single flow path.

In some embodiments, the pipeline leak detecting pig apparatus further comprises: a second inner instrument housing within the first inner instrument housing having a third housing end, a fourth housing end, second inner instrument housing inner diameter and second inner instrument housing outer diameter, wherein said second inner instrument housing comprises: pressure sensors P1, P2, P3; the flow meter; at least one battery; and a plurality of microcontroller PCBs, and wherein the second inner instrument housing is watertight and pressure resistant to protect the instruments therein.

In some embodiments of the pipeline leak detecting pig apparatus, a redundant set of pressure sensors, P1', P2' and P3' resides in the second inner instrument housing. The presence or lack of redundant components is generally determined by the size of the apparatus. Larger sizes, having more workable space, will accommodate redundant features such as annular seals, flow meters and pressure sensors. Whereas a smaller apparatus may not.

In some embodiments of the pipeline leak detecting pig apparatus, the microcontroller PCBs are configurable for wireless or wired communication to download collected data to a PC.

In some embodiments, the pipeline leak detecting pig apparatus further comprises: an odometer device for measuring distance traveled in the pipeline and locations for each position in the pipeline where a pressure and flow measurement is taken, wherein said distance and location values are conveyed to a third onboard PCB-3 for recording and later analysis.

In some embodiments of the pipeline leak detecting pig apparatus, the odometer device is configured to report a pulse for each recorded measurement taken by the pressure sensors and flow meter to a plurality of onboard PCB microcontrollers, wherein said microcontrollers record measurements and locations based on each of the reported pulse events of the odometer.

In some embodiments of the pipeline leak detecting pig apparatus, the rear pressure flow path PFP1, passes through the rear of the apparatus into the pressure vessel and into a pressure port in fluid communication with the P1 pressure sensor positioned within the second inner instrument housing, wherein the pressure vessel bounded by the inner diameter of the outer housing, the outer diameter of the first inner housing and a bulkhead.

In some embodiments of the pipeline leak detecting pig apparatus, a second onboard PCB microcontroller is provided for measuring and recording diagnostic data comprising battery voltage; system voltage; system current; and inertial measurement.

Provided herein is a method for detecting a leak in a pipeline wall comprising: providing the leak detection pig described above; traversing said leak detection pig apparatus through said pipeline; measuring a plurality of each of: the first pressure P1 in the pipeline behind the rear seal stack; the second pressure P2 in the control volume; the third pressure P3 in the pipeline in front of the front seal stack; and the flow rate if any, through the fluid path; analyzing the plurality of P1 measurements, P2 measurements, P3 measurements and flow rates to identify a possible leak in the pipeline as the control volume of the leak detection pig passes through the pipeline.

In some embodiments of the method; no leak is indicated when P1=P2>P3 and the flow meter measures a flow rate F=0 into the control volume.

In some embodiments of the method; a leak is indicated when P1>P2 and the flow meter measures a flow rate F>0 into the control volume.

Provided herein is a method for detecting a leak in a pipeline wall comprising providing a leak detecting pig apparatus comprising an outer housing having a first end, a second end, a first inner diameter and first outer diameter; a front seal stack coupled to the first end of the outer housing, positioned to seal against an inner surface of a pipeline; a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume; a fluid path fluidly coupled between the control volume, and the rear of the apparatus, in fluid communication with a flow meter within the apparatus; the flow meter, configured to measure a flow rate through the fluid path; a rear pressure sensor positioned to measure a first absolute pressure P1 in the pipeline behind the rear seal stack; a control volume pressure sensor positioned to measure a second absolute pressure P2 in the annular control volume; and a front pressure sensor positioned to measure a third absolute pressure P3 in the pipeline in front of the front seal stack; passing said apparatus through the bore of a pipeline, driven by a fluid flow in the pipeline; measuring the absolute pressures of P1, P2 and P3; measuring any fluid flow through the flow meter; measuring distance traveled by the apparatus; recording said pressures, fluid flow rates and distances with the aid of microcontroller PCBs; and downloading and analyzing said measurements with a PC at the end of a measurement run; wherein said pressure sensors P1, P2 and P3 measure absolute pressures at a plurality of locations of the pig as it passes through the pipeline; wherein said flow meter measures for any fluid flow through the pig from the back of the pig into the control volume as it passes through the pipeline; and determining the location and quantifying a leak flow rate; wherein a leak in the pipeline is detected when P1>P2 and the flow meter measures flow rate F>0 through the control volume.

In some embodiments, the method further comprises providing microcontroller PCBs for recording absolute pressures of P1, P2 and P3; wherein pressure in the control volume equals pressure in the rear of the leak detecting pig apparatus before the front seal stack of the apparatus passes a leak in the pipeline.

In some embodiments, the method further comprises providing the flow meter configurable to detect flow values as low as about 0.5 gallons per minute and greater than or equal to about 1000 gallons per minute, depending on the diameter of the tool and pipeline being inspected.

Provided herein is a pipeline leak detecting pig apparatus for detecting leaks in the wall of a pipeline, the apparatus comprising: an outer housing having a first end, a second end, a first inner diameter and first outer diameter; a front seal stack coupled to the first end of the outer housing, positioned to seal against an inner surface of a pipeline; a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume; a fluid path fluidly coupled between the control volume and the rear of the apparatus, in fluid communication with a flow meter; the flow meter, positioned to measure a flow rate through the fluid path; wherein said flow meter measures for any fluid flow through the pig from the rear of the apparatus into the control volume; and wherein a leak in the pipeline can be detected when the flow meter measures flow rate F>0 through the control volume.

In some embodiments, the pipeline leak detecting pig apparatus further comprises a rear pressure sensor positioned to measure a first absolute pressure P1 in the pipeline behind the rear seal stack; a control volume pressure sensor positioned to measure a second absolute pressure P2 in the control volume; and a front pressure sensor positioned to measure a third absolute pressure P3 in the pipeline in front of the front seal stack; wherein said pressure sensors P1, P2 and P3 measure absolute pressures at each location of the pig as it passes through the pipeline, wherein said flow meter measures for any fluid flow through the pig from the back of the pig into the control volume; and wherein a leak in the pipeline can be further verified and quantified when P1>P2 and the flow meter measures flow rate F>0 through the control volume.

Provided herein is a method for detecting a leak in a pipeline wall comprising: providing a leak detecting pig apparatus comprising an outer housing having a first end, a second end, a first inner diameter and first outer diameter; a front seal stack coupled to the first end of the outer housing, positioned to seal against an inner surface of a pipeline; a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume; a fluid path fluidly coupled between the control volume and the rear of the apparatus, in fluid communication with a flow meter and the pipeline behind the apparatus; the flow meter, positioned to measure a flow rate through the fluid path; an odometer for measuring distance traveled by recording pulses for each flow rate recorded; passing said apparatus through the bore of a pipeline, driven by a fluid flow in the pipeline; measuring any fluid flow through the flow meter; measuring distance traveled by the apparatus; recording said fluid flow rates and distances with the aid of microcontroller PCBs; and downloading and analyzing said measurements with a PC at the end of measurement run; wherein said flow meter measures any fluid flow through the pig, from the rear of the apparatus into the control volume, as it passes through the pipeline; and determining the location and quantifying a leak volume;

wherein a leak in the pipeline is detected when the flow meter measures flow rate F>0 through the control volume.

Additional aspects and advantages of the present disclosure will become readily apparent to those skilled in this art from the following detailed description, wherein only exemplary embodiments of the present disclosure are shown and described, simply by way of illustration of the several modes or best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the apparatus and method are set forth with particularity in the appended claims. A better understanding of the features and advantages of the present apparatus and method will be obtained by reference to the following detailed description that sets forth illustrative embodiments, in which the principles of the apparatus and method are utilized, and the accompanying drawings of which:

FIG. 5 depicts a view of cross-section I-I, taken through the center of the annular body of the Leak Detection Device with multiple longitudinal cross-section cuts II-II, III-III, IV-IV and V-V taken through section I-I.

FIG. 6A depicts a longitudinal cross-section of the device, II-II, taken through the Control Volume Pressure Sensor pathway.

FIG. 9A depicts a longitudinal cross-section of the device, V-V, illustrating the flow path from the flow meter to the control volume (CV) of the device.

FIG. 9B depicts a detailed view of FIG. 9A, showing the flow path from the flow meter to the control volume (CV) of the device.

Figure 1:
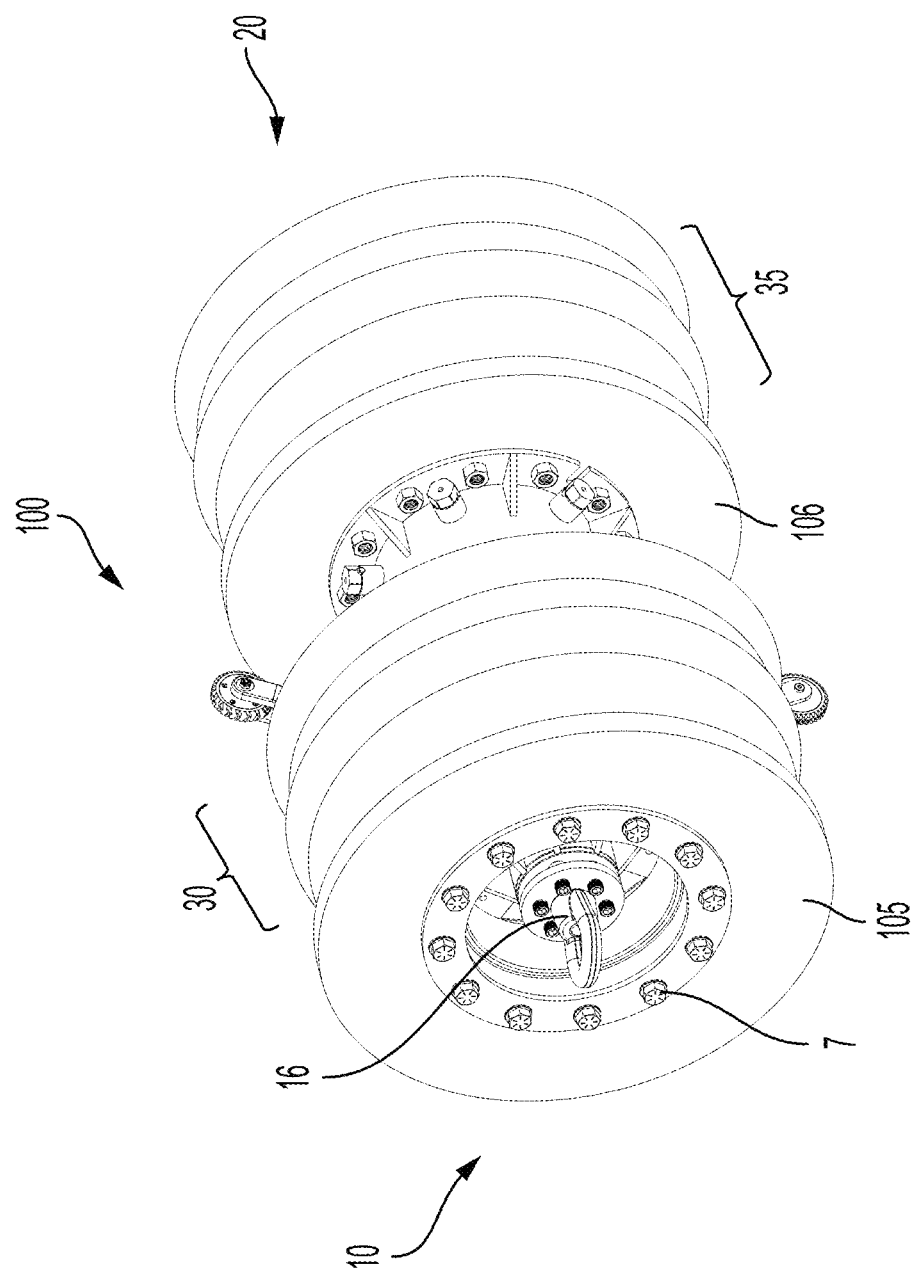
FIG. 1 depicts a top front perspective view of one embodiment of a leak detection pig of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

While preferred embodiments of the present disclosure have been shown and described herein, it will be obvious to those skilled in the art that such embodiments are provided by way of example only. Numerous variations, changes, and substitutions will now occur to those skilled in the art without departing from the apparatus and method, in accordance with the claims. It should be understood that various alternatives to the embodiments of the apparatus and method described herein may be employed in practicing the apparatus and method.

The present device will now be described more fully hereinafter with reference to the accompanying drawings which illustrate embodiments of the leak detection tool, (LDT) or Leak Detection Pig (LDP). This apparatus may, however, be embodied in many different forms and should not be construed as limited to the illustrated embodiments set forth herein. Rather, these embodiments are provided so that this disclosure will be thorough and complete, and will fully convey the scope of the device to those skilled in the art.

The following description of the exemplary embodiments refers to the accompanying drawings. The following detailed description does not limit the apparatus and method. Instead, the scope of the apparatus and method is defined by the appended claims.

Reference throughout the disclosure to "an exemplary embodiment," "an embodiment," or variations thereof means that a particular feature, structure, or characteristic described in connection with an embodiment is included in at least one embodiment of the subject matter disclosed. Thus, the appearance of the phrases "in an exemplary embodiment," "in an embodiment," or variations thereof in various places throughout the disclosure is not necessarily referring to the same embodiment. Further, the particular features, structures or characteristics may be combined in any suitable manner in one or more embodiments.

As used herein, and unless otherwise specified, the term "LDT", "LDP", "Leak Detection Tool", Leak Detection Pig ", Inspection Pig", "Smart Pig", "Pig Apparatus" or simply "pig" generally refers to a sophisticated apparatus or smart tool that is inserted into and travels throughout the length of a pipeline, typically driven under pressure by the product or fluid flowing in the pipeline itself, equipped with sensors and gauges to detect anomalies, corrosion, cracks, or other defects. "PIG" may also be an acronym for "Pipeline Inspection Gauge" or "Pipeline Inspection Gadget".

As used herein, and unless otherwise specified, the term "CV" or "Control Volume" generally refers to a theoretically controlled volume defined by the annular space between the front seal stack, the rear seal stack, the inside diameter of the pipeline and the outside diameter of the pig housing between the front and rear seal stacks.

As used herein, and unless otherwise specified, the term "fluid flow path" generally refers to the path that a fluid could travel between the inside diameter of the pipeline at the rear of the leak detecting pig, through a flow valve on the interior of the leak detecting pig and into the control volume of the leak detecting pig, defined by the annular space between the front seal stack, the rear seal stack, the inside diameter of the pipeline and the outside diameter of the pig housing between the front and rear seal stacks.

As used herein, and unless otherwise specified, the term "pressure flow path" generally refers to the path that a pressurized fluid would follow from an origin point to a destination point such as a pressure gauge or sensor.

As used herein, and unless otherwise specified, the term "absolute pressure" generally refers to a pressure measurement relative to a reference of zero pressure. The reference pressure is as close as possible to a vacuum (similar to measuring temperature in Kelvin, which uses absolute zero as its reference point). Regardless of location or altitude, an absolute pressure measurement remains consistent. Examples include altimeters and weather stations that measure atmospheric pressure changes.

Whereas "differential" pressure is the difference in pressure between two points in a system. Differential pressure is commonly used to measure flow in pipes or ducts or to detect blockages or seized valves. If pressure before a valve is higher than after it (in the direction of flow), there's an obstruction between the two measurement points.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 10.0 gallons, 9.0 gallons, 8.0 gallons, 7.0 gallons, 6.0 gallons, 5.0 gallons, 4.0 gallons, 3.0 gallons, 2.0 gallons, 1.0 gallons, 0.9 gallons, 0.8 gallons, 0.7 gallons, 0.6 gallons. 0.5 gallons, 0.4 gallons, 0.3 gallons, 0.2 gallons, 0.1 gallons, 0.09 gallons. 0.08 gallons, 0.07 gallons, 0.06 gallons, 0.05 gallons, 0.04 gallons, 0.03 gallons, 0.02 gallons or 0.01 gallons of a given value or range.

In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 5.0 kg, 2.5 kg, 1.0 kg, 0.9 kg, 0.8 kg, 0.7 kg, 0.6 kg, 0.5 kg, 0.4 kg, 0.3 kg, 0.2 kg or 0.1 kg of a given value or range, including increments therein. In certain embodiments, the term "about" or "approximately" means within 1 hour, within 45 minutes, within 30 minutes, within 25 minutes, within 20 minutes, within 15 minutes, within 10 minutes, within 5 minutes, within 4 minutes, within 3 minutes within 2 minutes, or within 1 minute. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range, including increments therein.

As used herein, and unless otherwise specified, the term "substantially", or "substantially equal" means within 1 or 2 standard deviations. In certain embodiments, the term "substantially", or "substantially equal" means within 5%, 4%, 3%, 2%, 1%, 0.5%, 0.1%, or 0.05% of a given value or range. In certain embodiments, the term "substantially", or "substantially equal" means within 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "substantially", or "substantially equal" means within 1.0 kg, 0.9 kg, 0.8 kg, 0.7 kg, 0.6 kg, 0.5 kg, 0.4 kg, 0.3 kg, 0.2 kg or 0.1 kg of a given value or range, including increments therein. In certain embodiments, the term "substantially", or "substantially equal" means within 2 minutes, or within 1 minute. In certain embodiments, the term "substantially", or "substantially equal" means within 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range, including increments therein.

As used herein, and unless otherwise specified, the term "plurality", and like terms, refers to a number (of things) comprising at least one (thing), or greater than one (thing), as in "two or more" (things), "three or more" (things), "four or more" (things), etc.

As used herein, the terms "connected", "operationally connected", "coupled", "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, and unless otherwise specified, the term "anterior" or "front" can refer to and means the front surface of the body; or often used to indicate the position of one structure relative to another, that is, situated nearer the front part of the body, apparatus or structure.

As used herein, and unless otherwise specified, the term "posterior" or "rear" can refer to and means the back surface of the body; or, often used to indicate the position of one structure relative to another, that is, nearer the back of the body, apparatus or structure.

As used herein, and unless otherwise specified, the term "superior" can refer to and means situated nearer the top in relation to a specific reference point; opposite of inferior; or often used to indicate the position of one structure relative to another, that is, it may also mean situated above or directed upward relative to an apparatus or structure.

As used herein, and unless otherwise specified, the term "inferior" can refer to and means situated nearer the bottom in relation to a specific reference point; opposite of superior. or often used to indicate the position of one structure relative to another, that is, it may also mean situated below or directed downward relative to an apparatus or structure.

As used herein, and unless otherwise specified, the term "medial" can refer to and means situated toward the median plane or midline of the structure or apparatus.

As used herein, and unless otherwise specified, the term "lateral" can refer to and means denoting a position farther from the median plane or midline of the body or a structure. It may also mean "pertaining to a side" of an apparatus or structure.

As used herein, the term "proximity" means nearness in space or relationship, but not excluding the potential to be touching. Proximity is also alternatively meant to mean that one thing may be so close to another thing as to be "in direct or nearly direct contact" (in proximity) with another thing along some point. To "place something in proximity" is also meant to mean that items are "paired" or "mated together" either in their paired function or at some point of contact.

As used herein, and unless otherwise specified, the term "vertically oriented" and similar terms mean; generally perpendicular to, at, or near, right angles to a horizontal plane; in a direction or having an alignment such that the top of a thing is above the bottom. In certain embodiments, the term "vertically oriented" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, the term "horizontally oriented" and similar terms mean; generally perpendicular to, at, or near, right angles to a vertical plane; in a direction or having an alignment such that the top of a thing is generally on, or near the same plane as the bottom, both being parallel or near parallel to the horizon. In certain embodiments, the term "horizontally oriented" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, the term "substantially perpendicular" and similar terms mean generally at or near 90 degrees to a given line, or surface or to the ground. In certain embodiments, the term "substantially perpendicular" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

Generally, the present disclosure provides an improved device and method for detecting, locating and quantifying a leak in a pipeline used in the transport of fluids such as water, oil and gases, typically suitable for the petrochemical industry.

Figure 2:
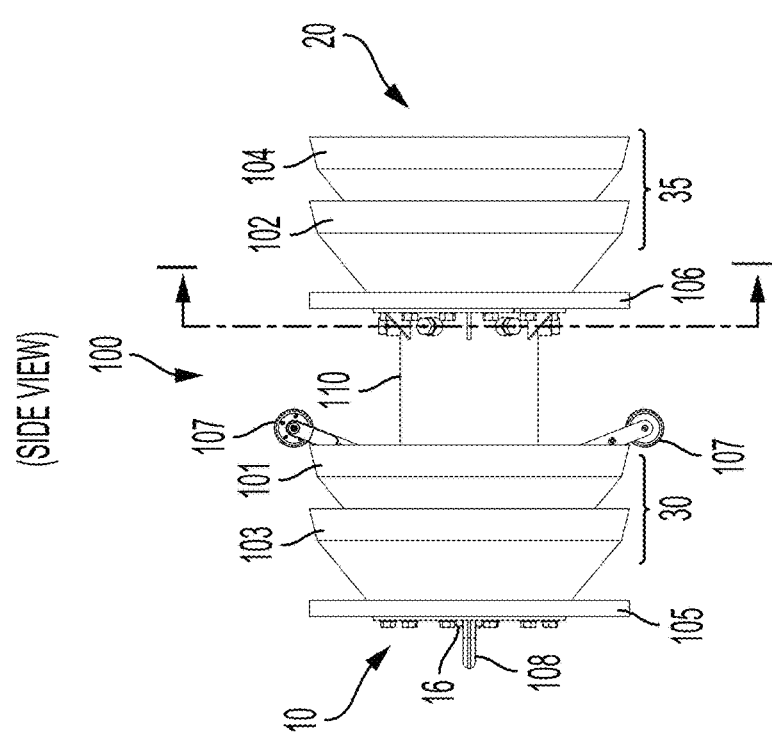
FIG. 2 depicts a side view of one embodiment of a leak detection pig of the present disclosure.

Referring now to FIGS. 1 and 2, a representative illustration of the present leak detection tool or apparatus 100 is shown and can have any given length and diameter, as needed. Generally, the device comprises a central annular body with an outer housing 110 having a first (front) end 10, a tow hook 108, a second (rear) end 20, a first outer diameter 15 and a first inner diameter 25 (shown in 6A, 6B and others); a front seal stack 30 coupled to the first end of the outer housing, typically with a smaller annular front seal assembly disc 105, the front seal stack positioned to seal against an inner surface of a pipeline 201; a rear seal stack 35 coupled to the second end of the outer housing, typically with a smaller annular rear seal assembly disc 106, said rear seal stack 35 positioned to seal against the inner surface of the pipeline 201, such that an annular space defined between the front seal stack 30, the rear seal stack 35, the first outer diameter 15 of the outer housing 110, and the inner pipeline surface 201 defines an annular control volume (CV) 120; a fluid path 118 fluidly coupled between the control volume 120, through the rear 20 of the apparatus 100, and in communication with a flow meter 117 and the pipeline inside diameter fluid volume 202; the flow meter 117, configured to measure a flow rate "F" through the fluid path 118; a rear pressure sensor 112 positioned to measure a first absolute pressure P1 from the pipeline behind the rear seal stack 35; a control volume pressure sensor 114 positioned to measure a second absolute pressure P2 from the control volume 120; and a front pressure sensor 116 positioned to measure a third absolute pressure P3 in the pipeline ahead of the front seal stack 30; wherein said pressure sensors P1, P2 and P3 measure absolute pressures at each location of the pig as it passes through a pipeline 200; wherein said flow meter 117 measures for any fluid flow moving through the apparatus 100 from the pipeline through the rear of the apparatus and the flow meter 117, the fluid path 118 and into the control volume 120; and wherein a leak 5 in the pipeline can be detected when P1>P2 and the flow meter measures flow rate F>0 through the control volume.

As will be shown later in FIG. 11B, when the absolute pressure P2 in the control volume 120 drops suddenly, the drop in absolute pressure in the control volume 120 coincides with the presence of a leak 5. Additionally, and more importantly, when the front seal stack 30 passes a leak 5 in the pipeline, the flow meter 117 will correspondingly register a flow rate F>0, corresponding to the drop in pressure P2. In other words, a large absolute pressure drop in P2 will generate a large flow rate in the flow meter as fluid leaves the control volume 120 through the leak and is replenished by the fluid pressure from P1 behind the apparatus.

Correspondingly, as the rear seal stack 35 passes the leak 5, the flow meter 117 will once again return to a stable condition where F=0, and P2 should quickly recover to the same absolute pressure as P1 from behind the apparatus.

One of skill in the art will now recognize through the examples provided that the same principle can be demonstrated using this device without the use of pressure sensors at all. In some embodiments, a leak can be characterized by the flow meter alone, in that any fluid lost through a leak in the pipeline as the Leak Detecting Tool (LDT) control volume passes over it, can only be replaced by the fluid moving through the flow path of the LDT and the flow meter in the flow path will register and quantify the volume of fluid flow lost through the leak by the rate of flow through the flow meter as the control volume passes over the leak. In the representative example described herein, the flow meter is capable of detecting flow as low as 0.5 gpm or greater than or equal to about 1000 gpm.

Referring to the side view in FIG. 2, one can clearly see the apparatus 100, comprising the front end 10, the tow hook 108, the front seal stack 30, comprising at least two flexible annular seals 101, 103, and the rear seal stack 35 also comprising at least two flexible seals 102, 104, wherein the outermost annular seals 103, 104 are a redundant second seal pair, and the innermost annular seals 101, 103 form a first pair, which form front and rear ends of the annular control volume 120 (not shown) with the outer diameter of the outer housing 110, and the inner surface of the pipeline 201 (not shown). The redundant second pair of flexible seals 103, 104 are there in the event of seal loss by the primary seals 101, 102 within the Control Volume 120. The front seal stack is assembled and fixed to the front of the outer housing 110 with bolts 7 through a front seal assembly disc 105 and the rear seal stack is similarly assembled and fixed to the rear of the outer housing 110 with bolts 7 through a rear seal assembly disc 106. Also shown are representative odometer mechanisms 107 for recording distance travelled and locations of readings taken by sensors in the assembly when travelling through a pipeline. Also shown is Section I-I, a cross-section taken through the outer housing 110 at the approximate location of the control volume fluid flow ports 118 and P2 pressure ports 113. In some embodiments, there may be as many as four control volume fluid flow ports 118.

Figure 3:
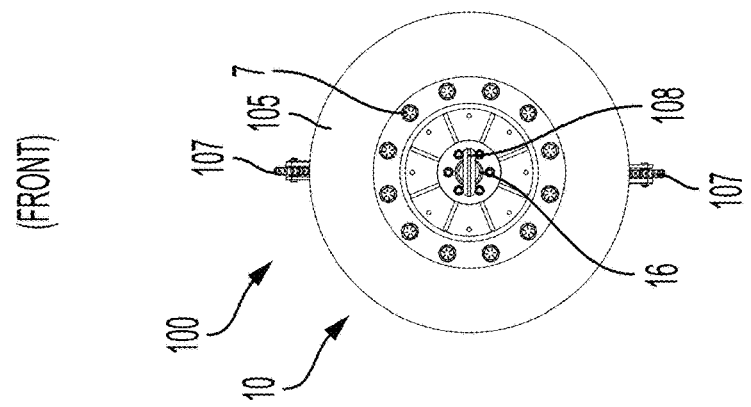
FIG. 3 depicts a front end view of one embodiment of a leak detection pig of the present disclosure.

Referring to the front view in FIG. 3, one can see the front end view 10 of the apparatus 100, comprising the front seal assembly disc 105, the assembly bolts 7, the tow hook 108, the anterior pressure port 16 for the internal P3 sensor that measures anterior or front pressure in front of the tool, located beneath the tow hook.

Figure 4:
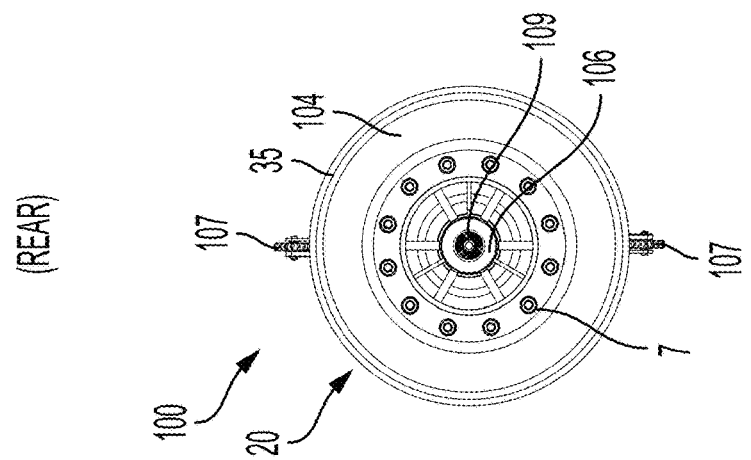
FIG. 4 depicts a rear end view of one embodiment of a leak detection pig of the present disclosure.

Referring to FIG. 4, one can see the rear end view 20 of the apparatus 100, comprising the rear seal stack assembly 35, the assembly bolts 7, the rear in-flow filter 109 and pressure port for the internal P1 sensor that measures posterior or rear pressure behind the tool, located in the center of the rear seal assembly disc 106. In some embodiments, the locations of the rear in-flow filter 109 and pressure port for the internal P1 sensor may change to accommodate space restrictions.

FIG. 5 shows the cross-section I-I, with representative additional longitudinal Cross-Sections II-II, III-III, IV-IV and V-V. Section II-II represents a longitudinal section through the apparatus 100 at the Control Volume Pressure Port and snorkel tubes 113 to the P2 sensors. Section III-III represents a longitudinal section through the apparatus 100 across the Rear Pressure Path. Section IV-IV represents a longitudinal section through the apparatus 100 across the anterior or front pressure port 106 and path. Section V-V represents a longitudinal section through the apparatus 100 across the Fluid Flow Path 118 from the posterior or rear of the tool, through the flow meter 117 to the Control Volume 120.

Figure 6B:
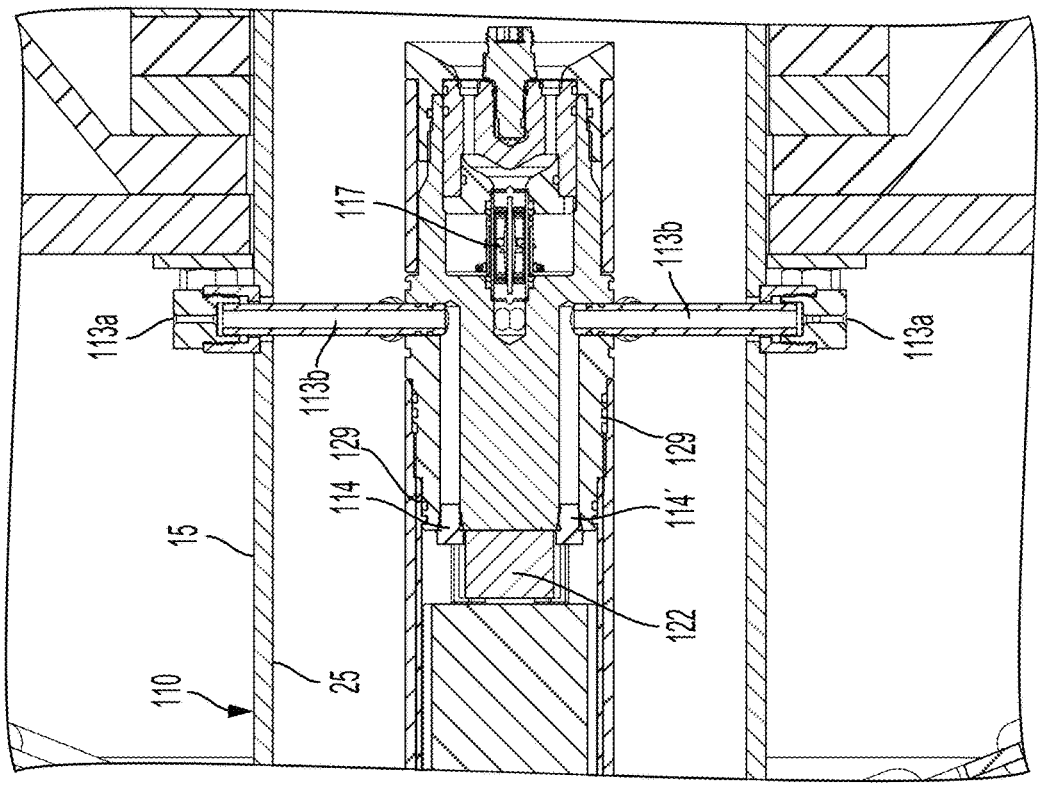
FIG. 6B depicts a detailed view of FIG. 6A showing the control volume pressure path.

Referring to FIG. 6A, Section II-II represents a longitudinal section through the apparatus 100 at the Control Volume Pressure Port and snorkel tubes 113 to the P2 sensors. This section view illustrates the control volume 120 pressure path to the P2 pressure sensors. The pressure path enters the pressure port 113a, (shown in FIG. 6B) from the theoretical annular control volume 120 between the front and rear seal stacks, the outer diameter 15 of the outer housing 110 and the inner diameter of the pipeline 201 (not shown in this view), travels through the snorkel tubes 113b (shown in FIG. 6B) until it reaches the P2 pressure sensors 114, 114' located circumferentially within the inner instrument housing 31. Also shown herein are the detailed components of the Front Seal Stack 30 comprising front primary seal 101, the front backup seal 103 and a plurality of seal spacers 123, between the front primary and front backup seal. The Front Seal stack is affixed to the front of the apparatus outer housing 110 with the front assembly disk 105, using bolts 7. Similarly, the Rear Seal Stack 35 is shown, comprising the primary rear seal 102, the rear backup seal 104 and a plurality of seal spacers 123, between the rear primary and rear backup seal. The Rear Seal stack is affixed to the rear of the apparatus outer housing 110 with the rear assembly disk 106, using bolts 7. Further, a spacer block 122 is illustrated just anterior to the pressure sensors, providing a barrier and spacing between the pressure sensors, the batteries 121 and a plurality of PCBs 125, 126, 127 located within the Second Inner Housing 41, positioned within the anterior portion of the First Inner Housing 31. (See FIGS. 6B, 8B for detailed views).

Referring to FIG. 6B, a detailed view of the Control Volume Pressure Path is shown, illustrating the pressure port 113a, the snorkel tubes 113b, the P2 pressure sensors 114, 114' positioned circumferentially within the first and second inner instrument housings 31, 41 and adjacent to the spacer block 122, wherein the pressurized fluid is forced up against the P2 Pressure sensors 114, 114' where an absolute pressure reading is made and recorded to the first PCB 125. Further, water and pressure-tight seals 129 are illustrated between the first and second inner instrument housings 31, 41.

Figure 7A:
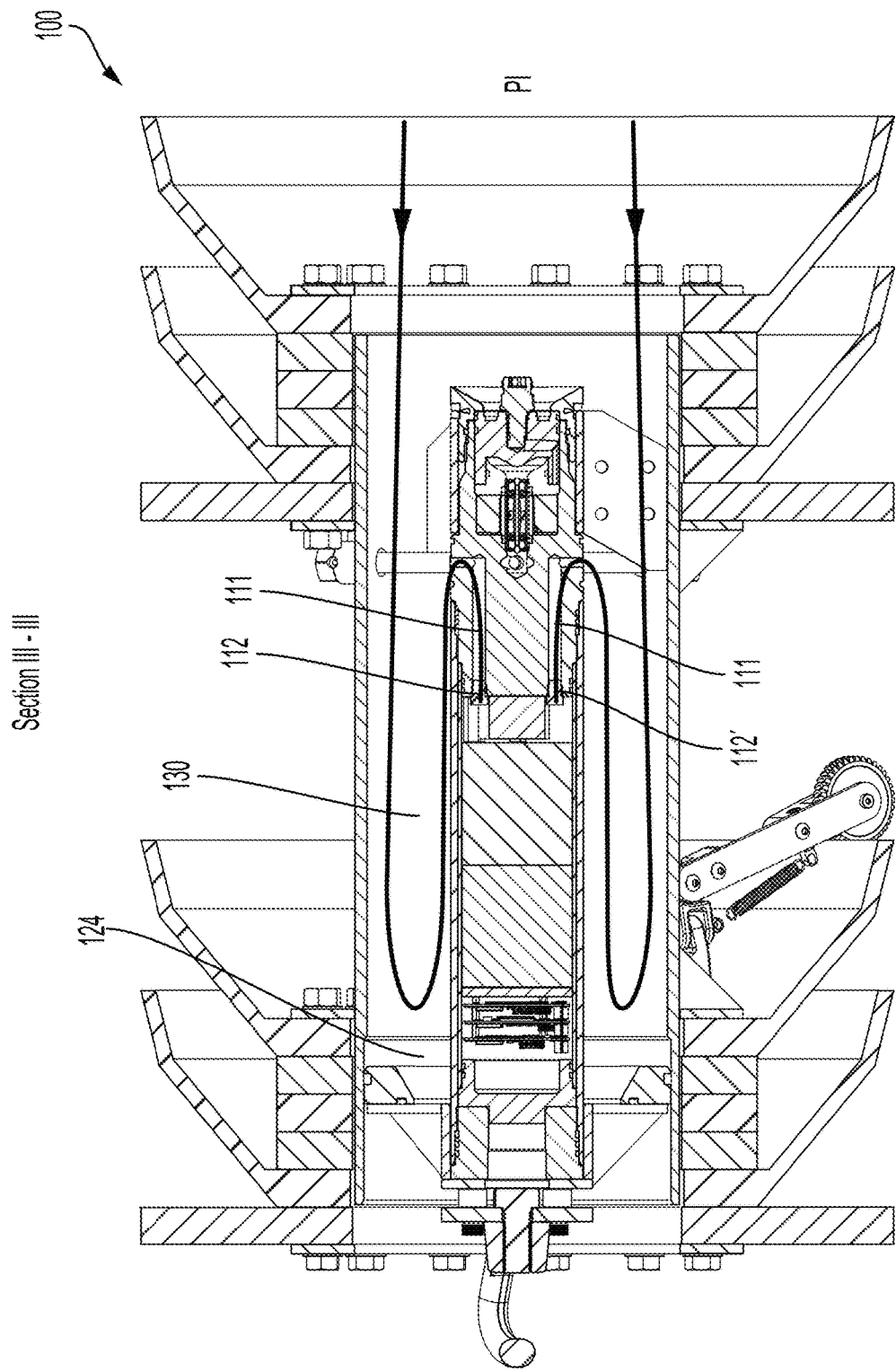
FIG. 7A depicts a longitudinal cross-section of the device, III-III, illustrating the Rear Pressure Sensor pathway through the device.

Referring to FIG. 7A, Section III-III represents a longitudinal section through the apparatus 100 showing the Rear Pressure Path for the Rear Pressure Sensors P1, 112, 112'. As shown, the rear of the tool is open to the interior volume of the pipeline and provides a path for the fluid in the pipeline to enter the tool and accumulate within the Leak Detection Tool 100, in an internal pressure chamber 130 defined by the inner diameter 25 of the outer housing 110, the bulkhead 124 and the outer diameter 35 of the first inner housing 31. Within the internal pressure chamber, a pressure access port, provides a pathway 111 for the pressurized fluid to reach the P1 sensors 112, 112' which are located circumferentially within first and second inner instrument housings 31, 41, adjacent to the Control Volume pressure sensors 114, 114', and the spacer block 122.

Figure 7B:
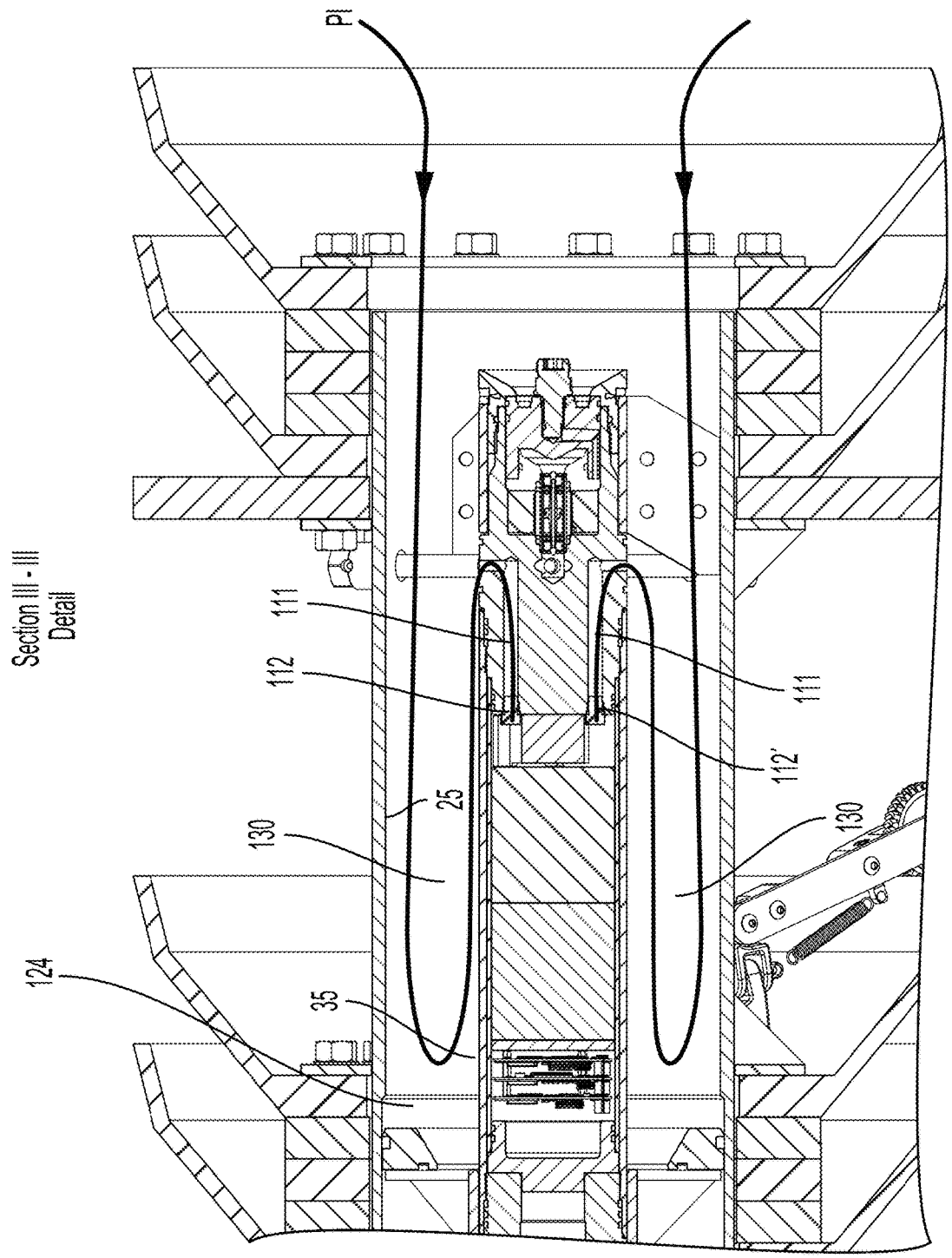
FIG. 7B depicts a detailed view of FIG. 7A, showing a detailed representation of the rear pressure pathway.

Referring to FIG. 7B, Detailed Section III-III is a representative view of the Rear Pressure Flow Path 111 to the P1 Sensors 112, 112'. As is shown therein, the pipeline fluid enters the rear of the tool and accumulates within the internal pressure chamber 130 which is the annular volume defined by the inner diameter 25 of the outer housing 110, the bulkhead 124 and the outer diameter 35 of the first inner housing 31. The internal pressure chamber 130 will, by design, have the same pressure P1 as the internal pressure of the pipeline behind the apparatus 100. From there, pressurized fluid can access the flow tube 111 to eventually reach the P1 pressure sensors 112, 112', which are located circumferentially within first and second inner instrument housings 31, 41, wherein the pressurized fluid is forced up against the P1 Pressure sensors 112, 112' where an absolute pressure reading is made and recorded to the first PCB 125.

Figure 8A:
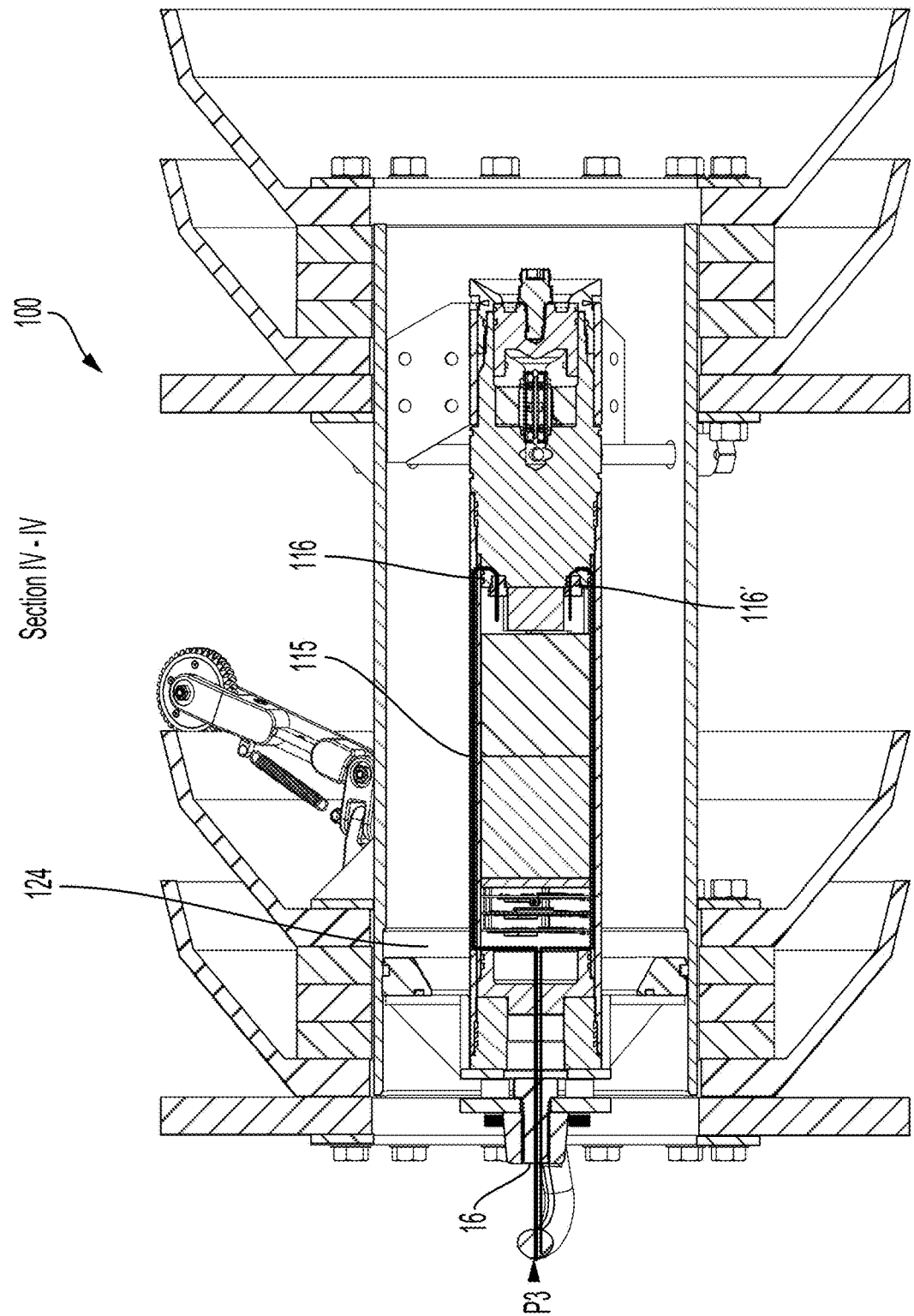
FIG. 8A depicts a longitudinal cross-section of the device, IV-IV, illustrating the Front Pressure Sensor pathway through the device.

Referring next to FIG. 8A, Section IV-IV is a representative view of the Front Pressure Sensor Flow Pathway 115. Shown herein is the cross-section view of the pathway which begins at the front of the tool, entering through the Front Pressure Port 16, traversing into a reservoir at the front of the tool adjacent to the bulkhead 124. From this point the pressurized fluid is forced between the inner diameter 37 of the first inner housing 31 and the outer diameter 45 of the second inner housing 41, positioned coaxially within the first inner housing 31 creating the front pressure pathway 115. Strategically placed seals 12 between the boundaries of the pressure vessel bulkhead 124, the first inner housing 31 the second inner housing 41, which insert through the pressure vessel bulkhead, assure the integrity of the Front Pressure Sensor Flow Pathway 115 and maintain the watertight integrity of the first and second inner instrument housings 31, 41. At the distal end of the front Pressure Sensor Flow Pathway 115, the pressurized anterior fluid hits additional seals 129 and is forced into a short snorkel tube and into the P3 Pressure sensors 116, 116' where an absolute pressure reading is made and recorded to the first PCB 125.

Figure 8B:
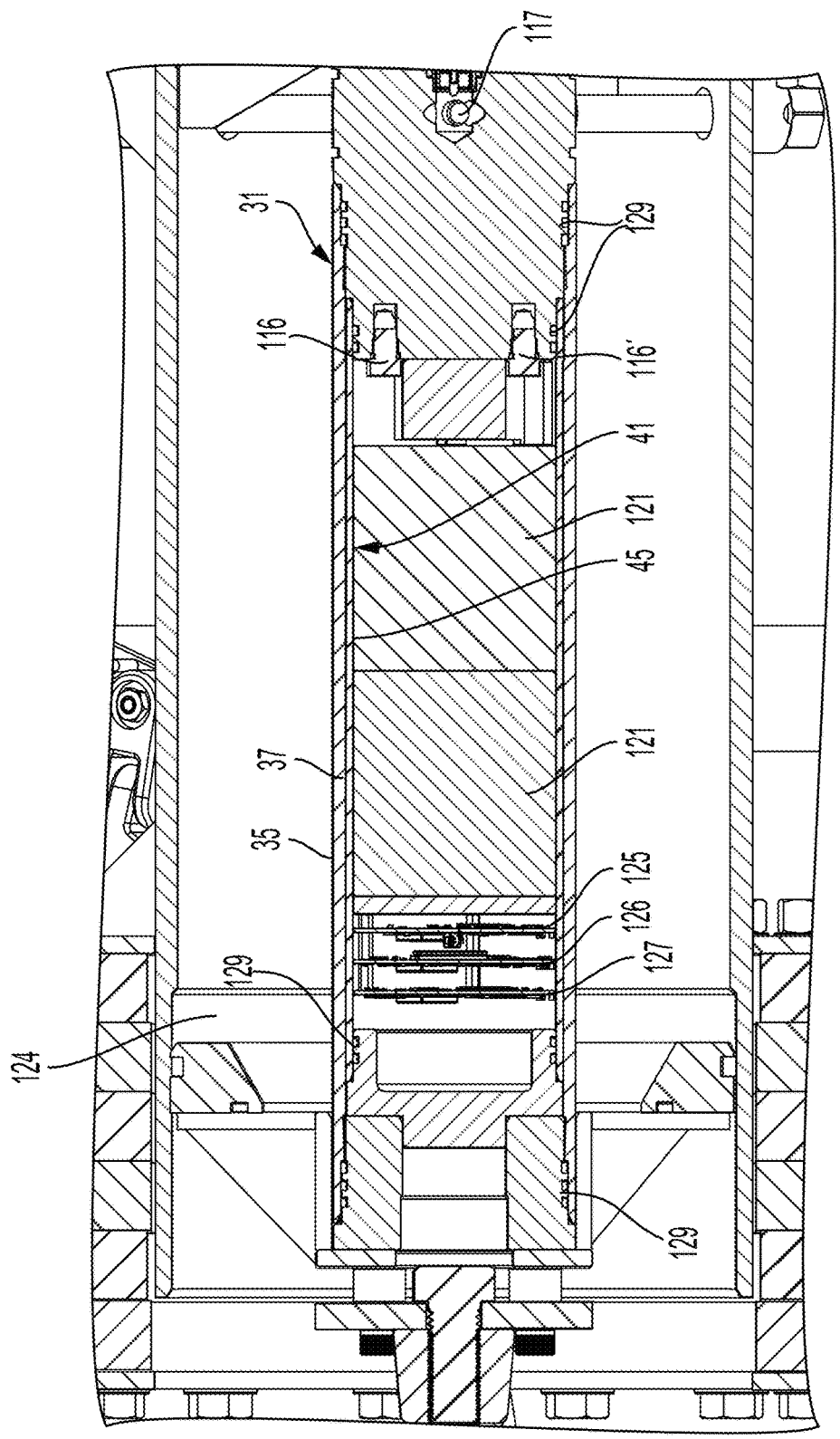
FIG. 8B depicts a detailed view of FIG. 8A, showing a detailed representation of the front pressure pathway.

Referring next to FIG. 8B, a detailed close-up view of Section IV-IV, a representative view of the first inner housing 31 and second inner instrument or control housing 41 is illustrated. In this detailed view, the first 31 and second 41 inner instrument housings are shown assembled together in such close proximity such that there is a very limited annular channel 115 between the inner diameter 37 of the first inner housing 31 and the outer diameter 45 of the second inner 41 housing, and the rear inner housing seals 129 where the annular channel 115 becomes the anterior pressure flow path, which ultimately terminates at the P3 pressure sensors 116, 116'.

Figure 8C:
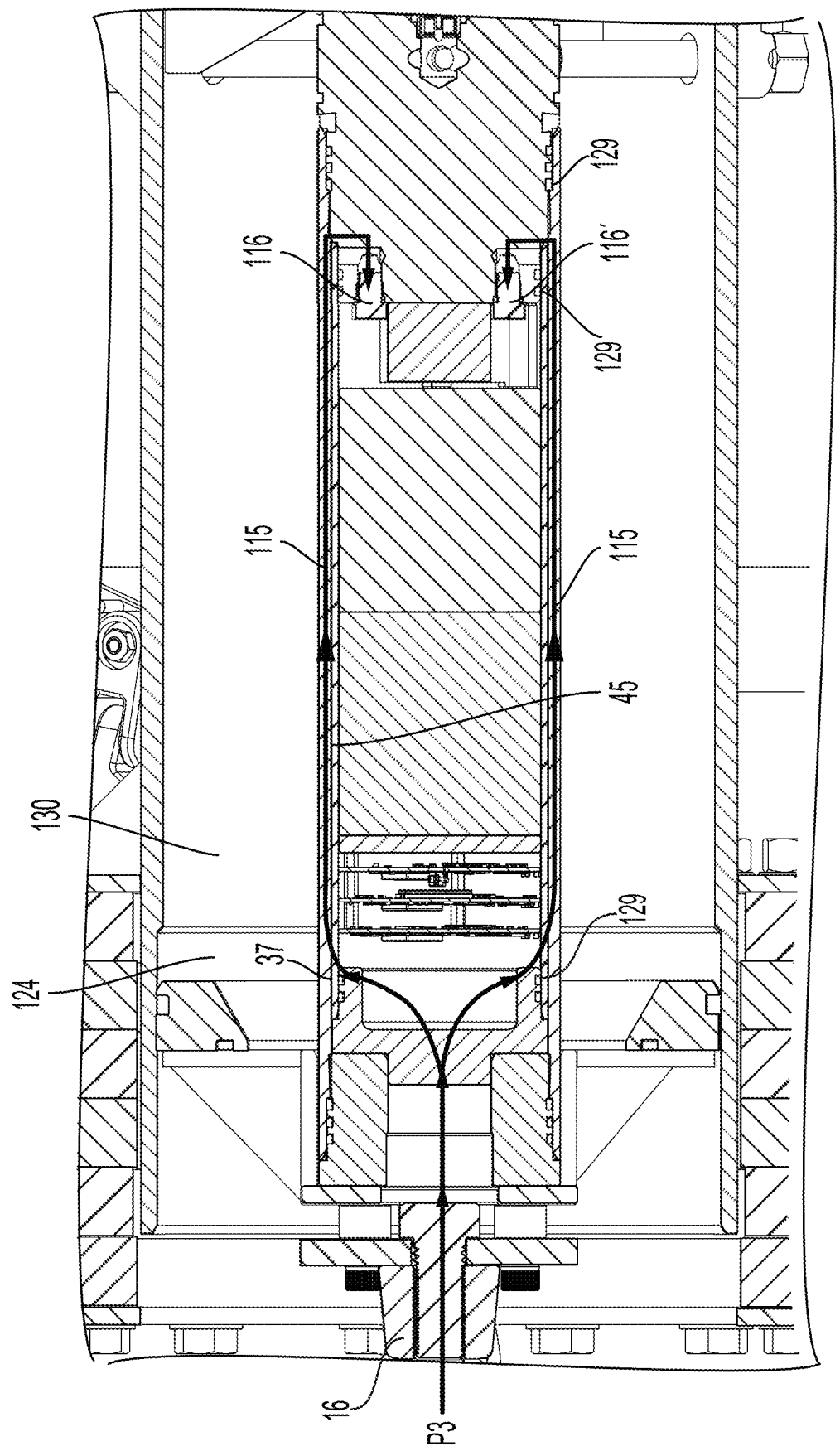
FIG. 8C depicts a detailed view of FIG. 8B showing a detailed view of the first and second inner control housings and the minimal clearance therebetween providing a pressure flow path for the front pressure, P3.

Expanding on FIG. 8B, FIG. 8C graphically illustrates the pressure flow path 115, beginning at the front pressure port 16, travelling past the bulkhead 124 and front inner housing seals 129, through the annular pressure flow passage 115 between the first inner housing 31 and second inner housing 41 to the pressure port located near the posterior end of the second inner housing 41, where it encounters the housing seals 129 and ultimately meets the P3 sensors 116, 116' where an absolute pressure reading is made and recorded to the first PCB 125.

Referring next to FIG. 9A; the Fluid Flow Path is illustrated. The Fluid Flow Path 118 is the path that any pressurized fluid 202 in the pipeline 200 would take, through the tool 100, into the Control Volume 120 and out through a leak 5 in a pipeline as the Leak Detection Tool 100 passes that location. As illustrated herein, if a leak is present in the pipeline 200 as the first seal stack 30 of the tool passes over it, exposing the and Control Volume 120 to the leak, pressurized fluid from the Control Volume 120 would escape through the leak; pressurized fluid 202 from the pipeline 200 would immediately enter the tool through rear inflow filter 109, entering the fluid flow path 118, at the rear end of the tool 20, and enter the posterior fluid flow path 118a, at the end of the first inner housing 31. From there, the pressurized fluid 202 would progress into the Calibrated Flow Meter 117, which measures the flow rate and reports it to the PCB-1. Pressurized fluid would then continuously proceed up the snorkel tube 118b and exit out through the Flow Port 118 into the Control Volume 120, attempting to restore the volume lost to the leak 5. This fluid flow would continue until at least the first rear flexible seal 102 of the rear seal stack 35 passed the point of the leak 5 in the pipeline 200.

Figure 10:
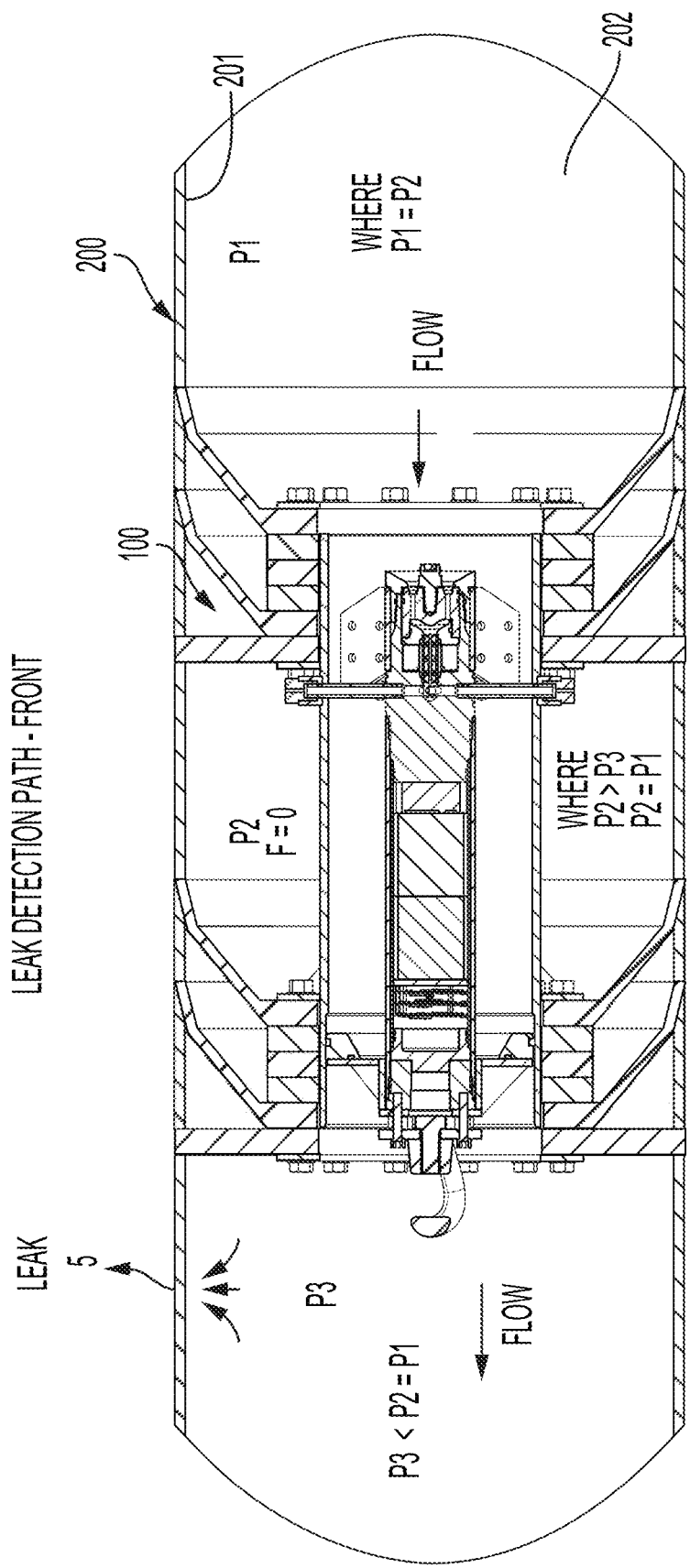
FIG. 10 illustrates the first in a sequence of events for the leak detection apparatus to determine the presence of a leak in a pipeline, prior to finding the leak.
Figure 11A:
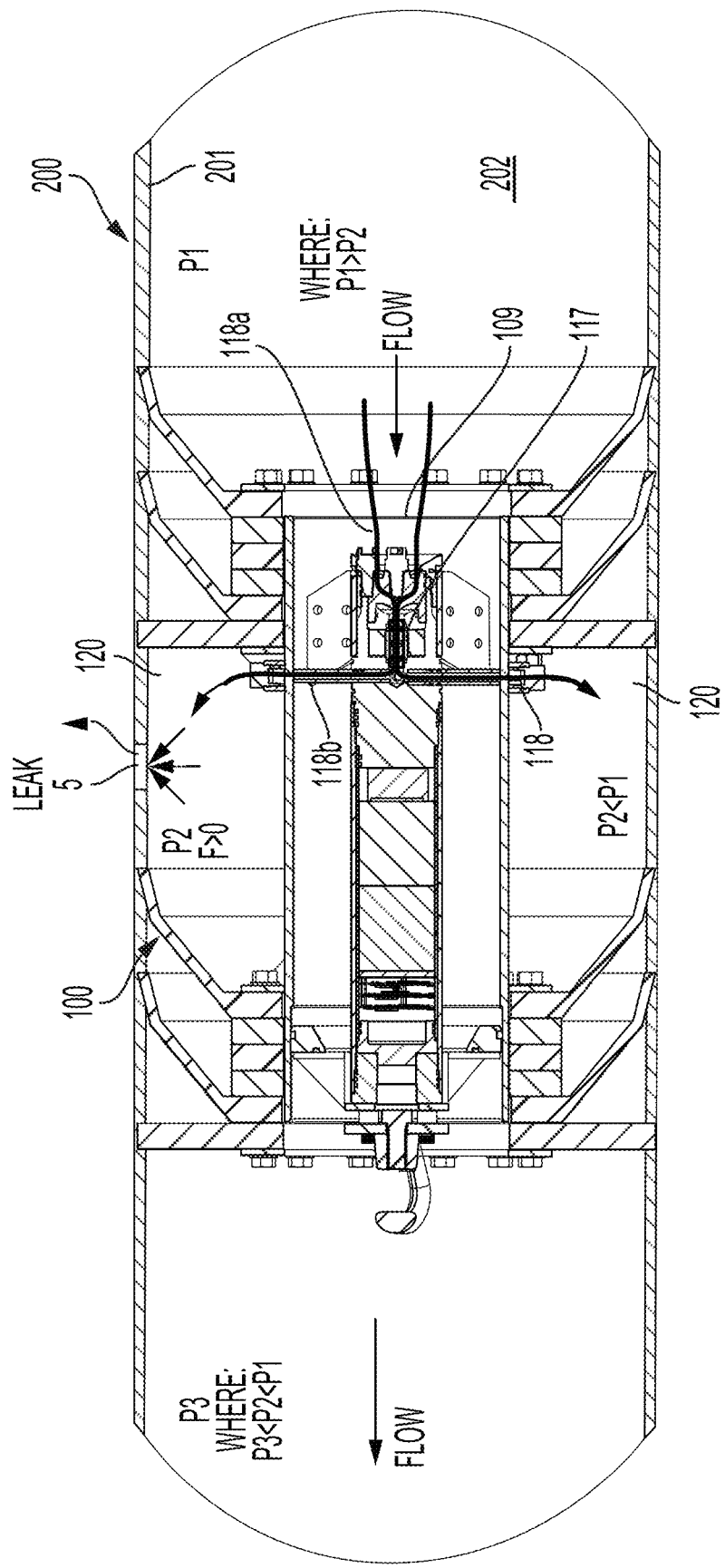
FIG. 11A illustrates the second in a sequence of three events for the leak detection apparatus to determine the presence of a leak in a pipeline, at the time when the device moves over the leak.
Figure 11B:
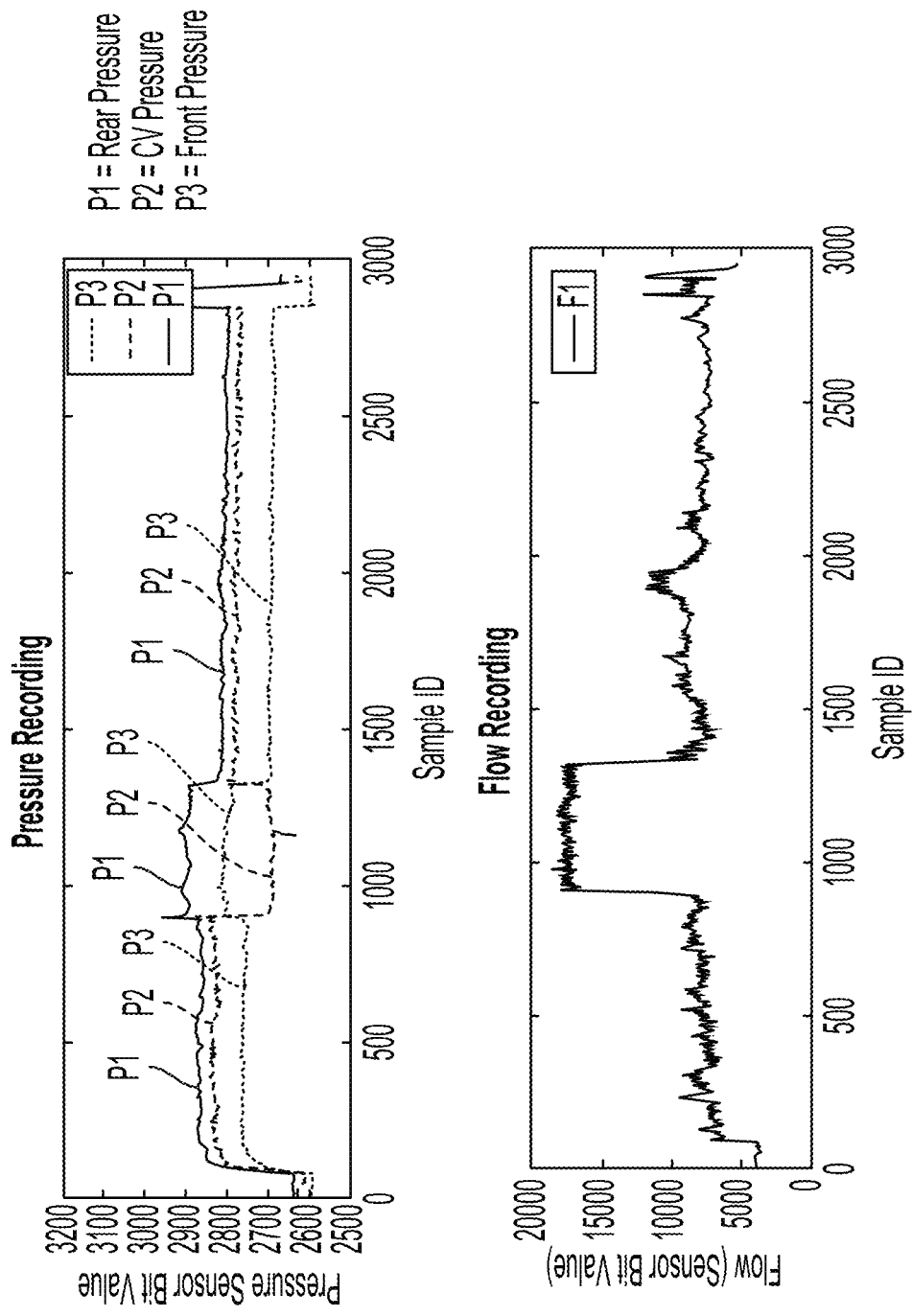
FIG. 11B illustrates the change in absolute pressures for P1, P2 and P3, where P2 is the control volume, which shows a significant drop in pressure and increase in flow to the control volume, when the device moves over the leak, as illustrated in FIG. 11A.
Figure 12:
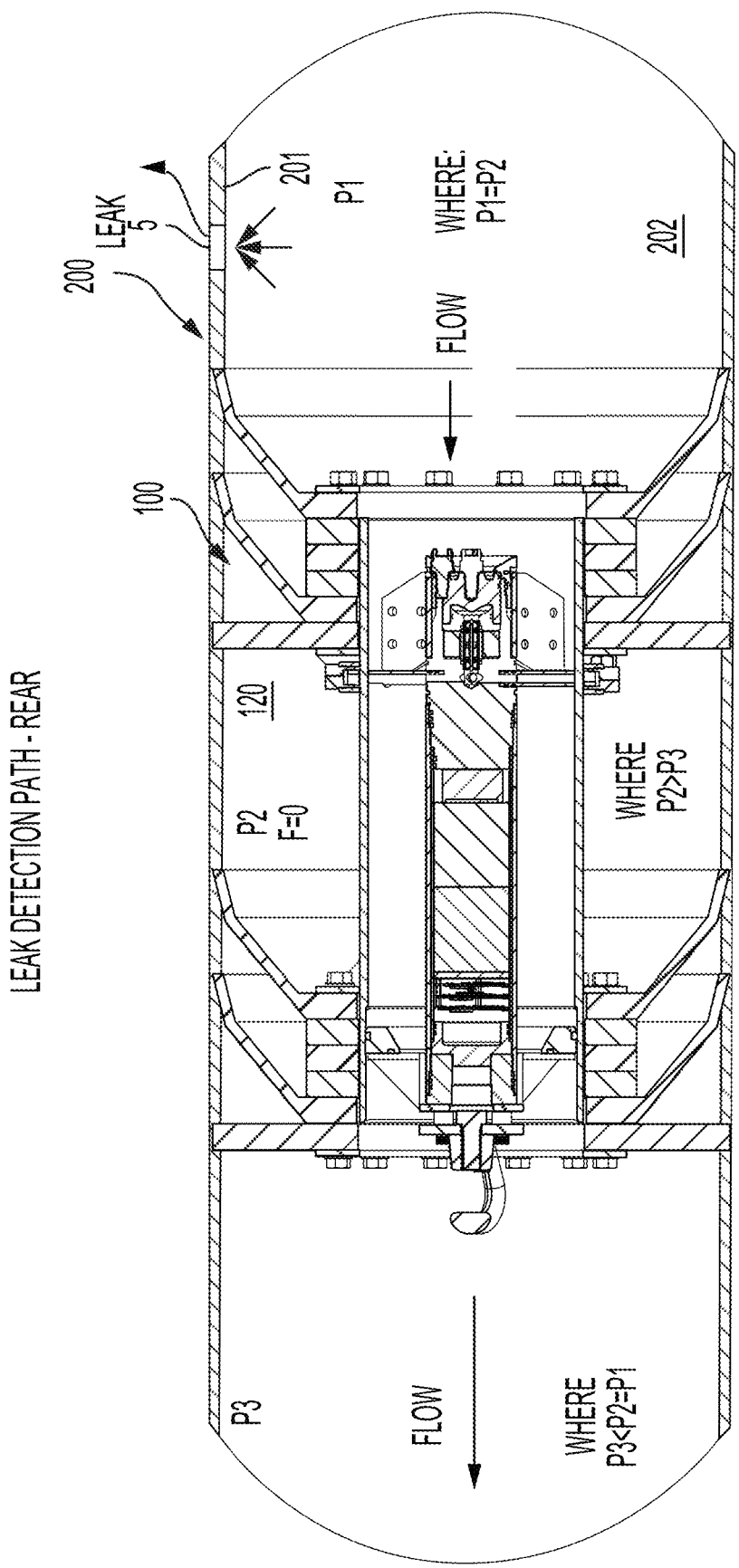
FIG. 12 illustrates the third in a sequence of events for the leak detection apparatus to determine the presence of a leak in a pipeline, at the time just after the device moves past the leak.

Referring next to FIGS. 10-12, which are representative illustrations of the Leak Detection Sequence provided by the present tool. FIG. 10 illustrates the presence of a leak 5 ahead of the leak detection tool 100, as it progresses through a pressurized pipeline 200. As illustrated herein, as the tool 100 approaches the point of a leak 5, the rear absolute pressure P1 will approximately equal the Control Volume absolute pressure P2 since, in theory, the Control Volume is a sealed annular volume being pressurized by the same pressurized fluid that is pushing the tool through the pipeline. Whereas the anterior or front absolute pressure P3 ahead of the Leak Detection Tool 100, will be less than P1 and P2 by some amount, allowing the tool to move forward through the pipeline, regardless of whether or not there is a leak in the pipeline.

Correspondingly, one would also expect that the Flow Rate F passing through the Control Volume and corresponding Flow Path to be F=0 since there should be no fluid escaping the Control Volume before it encounters any leaks.

As illustrated in FIG. 11A, when the front seal stack of the tool passes the over the leak and exposes the Control Volume, pressurized fluid should immediately flow out of the Control Volume and out through the leak, resulting in F>0 and P2<P1. This will result in an immediate response from the tool wherein the pressurized fluid P1 from the rear of the tool will attempt to compensate for the fluid loss in the control volume and begin pushing fluid 202 into the flow path 118, through the flow meter 117 and out into the Control Volume 120, while simultaneously attempting to equalize the pressure between the two regions. The flow meter 117 will measure the flow rate and nearly continuously report out the flow rate to the onboard PCB-1. Simultaneously, the P2 pressure sensor will record a pressure drop which provides a second confirmation of the leak and degree of severity of the leak for correlation with the fluid flow. Correspondingly, the odometer mechanism will be continuously recording speed and distance travelled so that the exact location of the leak can be later ascertained.

As noted previously, in some embodiments of the pipeline leak detecting pig apparatus, the odometer device is configured to report a pulse for each recorded measurement taken by the pressure sensors and flow meter to a plurality of onboard PCB microcontrollers, wherein said microcontrollers record measurements and locations based on each of the reported pulse events of the odometer. By recording the location based on the pulses transmitted by the odometer, having either the flow rate pulse readings or the pressure pulse readings the locations of a leak can be accurately determined. However, having both the flow rate pulse readings and the pressure pulse readings, provides a secondary confirmation of both the location and quantifiable confirmation of the severity of a leak.

FIG. 11B, provides a graphical representation of both absolute pressures and fluid flows before, during and after the point of contact for the Control Volume 120 of the Tool and a leak 5 in a pipeline which will be downloaded from the tool at the completion of an inspection run. It should now be obvious to one of skill in the art that the correlation of the data presented adds a significant degree of confidence to the findings and degree of severity of the leak found in the pipeline.

It should also be noted, as stated previously, that this tool also makes it possible to determine the presence of a leak even if the pressure sensors were not present or failed at some point in the run.

In the event of a catastrophic pressure sensor failure, a leak can still be accurately characterized by the flow meter alone, in that any fluid lost through a leak in the pipeline as the LDT control volume passes over it, can only be replaced by the fluid moving through the flow path of the LDT, since the flow meter is directly in the flow path and provides detailed flow rate data which is easily correlated with the odometer pulse recordings and measurements. The flow meter used for this tool is capable of detecting flow as low as about 0.5 gallons per minute and greater than or equal to about 1000 gallons per minute, depending on the diameter of the tool and pipeline being inspected.

Finally, FIG. 12 illustrates the return of the steady state absolute pressure condition in the control volume of the apparatus after the rear seal stack has passed the site of a leak, wherein the absolute pressure P2 within the controlled volume 120 once again equals the absolute pressure P1 of the fluid in the pipeline 202 behind the apparatus 100 and there is no fluid flow F through the flow meter 117. In other words: P2=P1, and F=0.

At some point after this stage of inspection, the tool is removed from the pipeline and the data recorded and stored on the onboard PCBs is downloaded to a PC where the date is analyzed and if found, the location and severity of the leak is determined so that appropriate repairs can be performed.

A further future consideration is the addition of acoustic sensors to provide a tertiary confirmation of the presence of a leak. Alternately, Acoustic sensors could be utilized as a redundant inspection system in the event of failure of either the pressure sensors or the flow meter.

While preferred embodiments of the present apparatus and method have been shown and described herein, it will be obvious to those skilled in the art that such embodiments are provided by way of example only. Numerous variations, changes, and substitutions will now occur to those skilled in the art without departing from the apparatus and method. It should be understood that various alternatives to the embodiments of the apparatus and method described herein may be employed in practicing the apparatus and method. It is intended that the following claims define the scope of the apparatus and method and that methods and structures within the scope of these claims and their equivalents be covered thereby.

What is claimed is:

1. A pipeline leak detecting pig apparatus for detecting leaks in the wall of a pipeline, the apparatus comprising:
   an outer housing having a first end, a second end, a first inner diameter and first outer diameter;
   a front seal stack coupled to the first end of the outer housing, positioned to seal against an inner surface of a pipeline;
   a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume;
   a fluid path fluidly coupled between the control volume, and the rear of the apparatus, in communication with a flow meter;
   the flow meter, configured to measure a flow rate through the fluid path;
   a rear pressure sensor positioned to measure a first absolute pressure P1 from the pipeline behind the rear seal stack;
   a control volume pressure sensor positioned to measure a second absolute pressure P2 from the control volume; and
   a front pressure sensor positioned to measure a third absolute pressure P3 from the pipeline ahead of the front seal stack;
   a first pressure port behind the rear seal stack in fluid communication with a first pressure flow path PFP1 between the rear seal stack and the first pressure sensor P1;
   a second pressure port and a second pressure flow path PFP2 between the control volume CV and the second pressure sensor P2;
   a third pressure port in front of the front seal stack in fluid communication with a third pressure flow path PFP3 located between a sealed pressure bulkhead and the third pressure sensor P3 and between a first inner instrument housing within the outer housing and a second inner instrument housing;
   wherein said pressure sensors P1, P2 and P3 measure absolute pressures at a plurality of locations of the apparatus as it passes through the pipeline,
   wherein said flow meter measures for any fluid flow through the apparatus from the rear of the apparatus into the control volume,
   wherein a leak in the pipeline can be detected when P1>P2 and the flow meter measures flow rate F>0 through the control volume, and
   wherein absolute pressure values from each location can be read directly by the pressure sensors P1, P2 and P3.

2. The pipeline leak detecting pig apparatus of claim 1, wherein the absolute pressure sensor values are conveyed to a first onboard microcontroller, PCB-1 for recording and later analysis.

3. The pipeline leak detecting pig apparatus of claim 2, wherein a flow rate of any fluid flowing through the pig, from the back of the pig into the control volume is also conveyed to the first onboard microcontroller, PCB-1 for recording and later analysis.

4. The pipeline leak detecting pig apparatus of claim 2, wherein each pressure sensor, P1, P2, P3 may have at least one redundant pressure sensor to provide a redundant absolute pressure value for each measurement, and wherein, said redundant absolute pressure sensor values are conveyed to the first onboard microcontroller, PCB-1 for recording and later analysis.

5. The pipeline leak detecting pig apparatus of claim 2, wherein a second onboard microcontroller PCB is provided for measuring and recording diagnostic data comprising:
   battery voltage;
   system voltage;
   system current; and
   inertial measurement.

6. The pipeline leak detecting pig apparatus of claim 1, wherein said front seal stack and rear seal stack may each comprise at least two flexible annular seals, wherein the outermost annular seals are a redundant seal pair, and the innermost annular seals form a primary or first pair, which form front and rear ends of the annular control volume with the outer diameter of the outer housing, and the inner surface of the pipeline.

7. The front seal stack and real seal stack of claim 6, further comprising seal spacers between each of the annular seals.

8. The pipeline leak detecting pig apparatus of claim 1, further comprising:
   a first inner instrument housing within the outer housing having a first inner instrument housing end, a second inner instrument housing end, a first inner instrument housing inner diameter and a first inner instrument housing outer diameter;
   wherein the first inner instrument housing outer diameter, the first inner diameter of the outer housing and a bulkhead create a pressure vessel within the leak detecting pig apparatus in communication with the pressurized fluid within the pipeline at rear of the leak detecting apparatus, and
   wherein the flow meter resides in the inner instrument housing and the fluid path to the control volume passes through the inner instrument housing and the pressure vessel and is in fluid communication with the control volume via a flow tube.

9. The pipeline leak detecting pig apparatus of claim 8, further comprising:
   a second inner instrument housing within the first inner instrument housing, having a third housing end, a fourth housing end, second inner instrument housing inner diameter and second inner instrument housing outer diameter;
   wherein said second inner instrument housing comprises:
      pressure sensors P1, P2, P3;
      the flow meter;
      at least one battery; and
      a plurality of onboard microcontroller PCBs;
   wherein the second inner instrument housing is watertight and pressure resistant to protect the instruments therein.

10. The pipeline leak detecting pig apparatus of claim 9, wherein a redundant set of pressure sensors, P1', P2' and P3' resides in the second inner instrument housing.

11. The pipeline leak detecting pig apparatus of claim 9, wherein a redundant flow meter resides in the second inner instrument housing.

12. The pipeline leak detecting pig apparatus of claim 9, wherein the microcontroller PCBs are configurable for wireless or wired communication to download collected data to a PC.

13. The pipeline leak detecting pig apparatus of claim 9, wherein a second onboard microcontroller PCB is provided for measuring and recording diagnostic data comprising battery voltage; system voltage; system current; and inertial measurement.

14. The pipeline leak detecting pig apparatus of claim 13, further comprising:
   an odometer device for measuring distance traveled in the pipeline and locations for each position in the pipeline where a pressure and flow measurement is taken;
   wherein said distance and location values are conveyed to a third onboard microcontroller PCB-3 for recording and later analysis.

15. The pipeline leak detecting pig apparatus of claim 14, wherein the odometer device is configured to report a pulse for each recorded measurement taken by the pressure sensors and flow meter to the plurality of microcontroller PCBs, wherein said microcontrollers make measurements based on each of the reported pulse events of the odometer.

16. The pipeline leak detecting pig apparatus of claim 1, wherein the rear pressure flow path PFP1 passes through the rear of the apparatus into a pressure vessel within the apparatus, and into the pressure port in fluid communication with the P1 pressure sensor positioned within a second inner instrument housing, wherein the pressure vessel bounded by the inner diameter of the outer housing, the outer diameter of the first inner housing and a bulkhead.

17. The pipeline leak detecting pig apparatus of claim 1, wherein the front pressure flow path PFP3 passes through the third pressure port and between an inner diameter of a first inner instrument housing and an outer diameter of a second inner instrument housing into the pressure port in fluid communication with the P3 pressure sensor positioned within the second inner instrument housing.

18. The pipeline leak detecting pig apparatus of claim 1, wherein control volume pressure flow path PFP2 passes through the outer diameter of the outer housing, through a pressure vessel into the pressure port in fluid communication with the P2 pressure sensor positioned within the second inner instrument housing.

19. The pipeline leak detecting pig apparatus of claim 1, wherein the Flow meter fluid path passes through a rear in-flow filter into the flow meter, through a control volume flow path through the outer housing to an exit port in the control volume,
   wherein the flow meter measures fluid volume flow when a leak in the pipeline is detected as the control volume passes.

20. A method for detecting a leak in a pipeline wall comprising:
   providing the leak detection pig of claim 1;
   traversing said leak detection pig apparatus through said pipeline;
   measuring a plurality of each of:
      the first pressure P1 in the pipeline behind the rear seal stack;
      the second pressure P2 in the control volume;
      the third pressure P3 in the pipeline in front of the front seal stack; and
      the flow rate through the fluid path;
   analyzing the plurality of P1 measurements, P2 measurements, P3 measurements and flow rates to identify a possible leak in the pipeline as the control volume of the leak detection pig passes through the pipeline.

21. The method of claim 20 wherein:
   no leak is indicated when P1=P2>P3 and the flow meter measures a flow rate F=0 into the control volume.

22. The method of claim 20 wherein:
a leak is indicated when P1>P2 and the flow meter measures a flow rate F>0 into the control volume.

23. A method for detecting a leak in a pipeline wall comprising:
providing a leak detecting pig apparatus comprising:
an outer housing having a first end, a second end, a first inner diameter and first outer diameter;
a front seal stack coupled to the first end of the outer housing, positioned to seal against an inner surface of a pipeline;
a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume;
a fluid path fluidly coupled between the control volume, and the rear of the apparatus, in fluid communication with a flow meter;
the flow meter, positioned to measure a flow rate through the fluid path;
a rear pressure sensor positioned to measure a first absolute pressure P1 in the pipeline behind the rear seal stack;
a control volume pressure sensor positioned to measure a second absolute pressure P2 in the annular control volume; and
a front pressure sensor positioned to measure a third absolute pressure P3 in the pipeline in front of the front seal stack;
passing said apparatus through the bore of a pipeline, driven by a fluid flow in the pipeline;
measuring the absolute pressures of P1, P2 and P3;
measuring any fluid flow through the flow meter;
measuring distance traveled by the apparatus;
recording said pressures, fluid flow rates and distances with the aid of microcontroller PCBs; and
downloading and analyzing said measurements with a PC at the end of measurement run;
a first pressure port behind the rear seal stack in fluid communication with a first pressure flow path PFP1 between the rear seal stack and the first pressure sensor P1;
a second pressure port and a second pressure flow path PFP2 between the control volume CV and the second pressure sensor P2;
a third pressure port in front of the front seal stack in fluid communication with a third pressure flow path PFP3 located between a sealed pressure bulkhead and the third pressure sensor P3 and between a first inner instrument housing within the outer housing and a second inner instrument housing;
wherein absolute pressure values from each location can be read directly by the pressure sensors P1, P2 and P3
wherein said pressure sensors P1, P2 and P3 measure absolute pressures at a plurality of locations of the pig as it passes through the pipeline;
wherein said flow meter measures any fluid flow through the pig into the control volume as it passes through the pipeline; and
determining the location and quantifying a leak flow rate;
wherein a leak in the pipeline is detected when P1>P2 and the flow meter measures flow rate F>0 through the control volume.

24. The method of claim 23, further comprising:
providing microcontroller PCBs for recording absolute pressures of P1, P2 and P3;
wherein pressure in the control volume equals pressure in the rear of the leak detecting pig apparatus before the front seal stack of the apparatus passes a leak in the pipeline.

25. The method of claim 23, further comprising:
providing the flow meter configurable to detect flow values as low as 0.5 gallons per minute and as high as about 1000 gallons per minute.

26. A pipeline leak detecting pig apparatus for detecting leaks in the wall of a pipeline, the apparatus comprising:
an outer housing having a first end, a second end, a first inner diameter and first outer diameter;
a first inner instrument housing within the outer housing having a first inner instrument housing end, a second inner instrument housing end, a first inner instrument housing inner diameter and a first inner instrument housing outer diameter;
wherein the first inner instrument housing outer diameter, the first inner diameter of the outer housing and a bulkhead create a pressure vessel within the leak detecting pig apparatus in communication with the pressurized fluid within the pipeline at rear of the leak detecting apparatus;
a front seal stack coupled to the first end of the outer housing, positioned to seal against an inner surface of a pipeline;
a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume;
a fluid path fluidly coupled between the control volume and the rear of the apparatus, in communication with a flow meter;
wherein the flow meter resides in the inner instrument housing and the fluid path to the control volume passes through the inner instrument housing and the pressure vessel and is in fluid communication with the control volume via a flow tube;
the flow meter, positioned to measure a flow rate through the fluid path;
wherein said flow meter measures for any fluid flow through the pig from the rear of the apparatus into the control volume; and
wherein a leak in the pipeline can be detected when the flow meter measures flow rate F>0 through the control volume.

27. The apparatus of claim 26, further comprising:
the rear pressure sensor positioned to measure a first absolute pressure P1 in the pipeline behind the rear seal stack;
the control volume pressure sensor positioned to measure a second absolute pressure P2 in the control volume; and
the front pressure sensor positioned to measure a third absolute pressure P3 in the pipeline in front of the front seal stack;
wherein said pressure sensors P1, P2 and P3 measure absolute pressures at each location of the pig as it passes through the pipeline,
wherein said flow meter measures for any fluid flow through the pig, from the rear of the apparatus into the control volume; and wherein a leak in the pipeline can be further verified and quantified when P1>P2 and the flow meter measures flow rate F>0 through the control volume.

28. A method for detecting a leak in a pipeline wall comprising:
  providing a leak detecting pig apparatus comprising:
    an outer housing having a first end, a second end, a first inner diameter and first outer diameter;
    a front seal stack coupled to the first end of the outer housing, positioned to seal against an inner surface of a pipeline;
    a rear seal stack coupled to the second end of the outer housing positioned to seal against the inner surface of the pipeline, such that an annular space defined between the front seal stack, the rear seal stack, the first outer diameter of the outer housing, and the inner pipeline surface defines an annular control volume;
    a fluid path fluidly coupled between the control volume and the rear of the apparatus, and in fluid communication with a flow meter and the pipeline behind the apparatus;
    the flow meter, positioned to measure a flow rate through the fluid path;
    an odometer for measuring distance traveled by recording pulses for each flow rate recorded;
    a first pressure port behind the rear seal stack in fluid communication with a first pressure flow path PFP1 between the rear seal stack and a first pressure sensor P1;
    a second pressure port and a second pressure flow path PFP2 between the control volume CV and a second pressure sensor P2;
    a third pressure port in front of the front seal stack in fluid communication with a third pressure flow path PFP3 located between a sealed pressure bulkhead and a third pressure sensor P3 and between a first inner instrument housing within the outer housing and a second inner instrument housing;
  passing said apparatus through the bore of a pipeline, driven by a fluid flow in the pipeline;
  measuring any fluid flow through the flow meter;
  measuring distance traveled by the apparatus;
  recording said fluid flow rates and distances with the aid of microcontroller PCBs; and
  downloading and analyzing said measurements with a PC at the end of measurement run;
  wherein said flow meter measures any fluid flow through the pig, from the rear of the apparatus into the control volume as it passes through the pipeline; and
  determining the location and quantifying a leak volume;
  wherein a leak in the pipeline is detected when the flow meter measures flow rate F>0 through the control volume.

* * * * *